United States Patent [19]
Toda et al.

[11] Patent Number: 6,124,845
[45] Date of Patent: Sep. 26, 2000

[54] COORDINATE INPUT DEVICE

[75] Inventors: Yasushi Toda; Hideki Suzuki, both of Iwaki, Japan

[73] Assignee: Alps Electric Co., Ltd., Tokyo, Japan

[21] Appl. No.: 08/789,364

[22] Filed: Jan. 27, 1997

Related U.S. Application Data

[63] Continuation of application No. 08/317,688, Oct. 5, 1994, Pat. No. 5,673,066.

[30] Foreign Application Priority Data

| Apr. 21, 1992 | [JP] | Japan | 4-101351 |
| Apr. 21, 1992 | [JP] | Japan | 4-101352 |
| Apr. 21, 1992 | [JP] | Japan | 4-101353 |
| Mar. 29, 1993 | [JP] | Japan | 5-093583 |

[51] Int. Cl.[7] ................... G09G 5/08
[52] U.S. Cl. ............ 345/157; 345/173; 345/163; 341/34
[58] Field of Search .............. 345/156, 157, 345/160, 163, 173, 179, 180, 182, 174, 104, 145; 178/18.01, 18.03, 18.05, 18.06, 19.01, 19.04; 273/148 B; 463/37; D14/114, 100, 107, 117.9; 341/34; 395/893; 364/927.64

[56] References Cited

U.S. PATENT DOCUMENTS

| 4,121,049 | 10/1978 | Roeber | 178/18 |
| 4,293,734 | 10/1981 | Pepper, Jr. | 178/19 |
| 4,302,011 | 11/1981 | Pepper, Jr. | 345/173 |
| 4,736,191 | 4/1988 | Matzke et al. | 345/174 |
| 4,745,565 | 5/1988 | Garwin et al. | 364/571 |
| 5,053,758 | 10/1991 | Cornett et al. | 340/712 |
| 5,117,071 | 5/1992 | Greanias et al. | 178/19 |
| 5,231,380 | 7/1993 | Logan | 340/706 |
| 5,327,161 | 7/1994 | Logan et al. | 345/157 |
| 5,374,787 | 12/1994 | Miller et al. | 178/18 |
| 5,404,458 | 4/1995 | Zetts | 345/173 |
| 5,432,531 | 7/1995 | Calder et al. | 345/173 |
| 5,446,480 | 8/1995 | Yoshida | 345/157 |
| 5,666,113 | 9/1997 | Logan | 345/173 |

FOREIGN PATENT DOCUMENTS

| 0383304 | 8/1990 | European Pat. Off. . |
| 0419145 A1 | 3/1991 | European Pat. Off. . |
| 58-181171 | 10/1983 | Japan . |
| 2139762 | 11/1984 | United Kingdom | 345/173 |
| 85-05477 | 12/1985 | WIPO | 345/173 |

OTHER PUBLICATIONS

*IBM Technical Disclosure Bulletin*, "Mouse/Keyboard Concept Incorporating Unique Devices For Controlling CRT Display Cursors", vol. No. 10B, Mar. 1985, pp. 6299–6305.

"Foot–Operated Mouse", *IBM Technical Disclosure Bulletin* vol. 28, No. 11, Apr. 1986.

*Primary Examiner*—Lun-Yi Lao
*Attorney, Agent, or Firm*—Brinks Hofer Gilson & Lione

[57] ABSTRACT

A cursor control device is provided which has good operability and can reflect clearly an operator's natural motion in accordance with a qualified value (conversion coefficient). The cursor control device is constituted of an operation plate 5 with an operation surface 7, an operation pressure detecting detector with a pressure-sensitive sensor 3 arranged on the back surface of the operation plate 5 to detect a touch pressure by a control member, and an arithmetic circuit. The arithmetic circuit performs an arithmetic operation of both the coordinate position and the moving rate of the control member using a detection signal from the operation pressure detection detector, and the movement of a cursor based on a first qualified value and a second qualified value. The first qualified value is determined according to the movement and the moving rate of a coordinate position. The second qualified value is determined according to the touch pressure of the control member.

7 Claims, 19 Drawing Sheets

COORDINATE INPUT DEVICE

This application is a continuation of application Ser. No. 08/317,688, filed Oct. 5, 1994 now U.S. Pat. No. 5,673,066.

BACKGROUND OF THE INVENTION

1. Field of the Invention

The present invention relates to a coordinate input device which inputs the coordinate position of an operation surface pointed by a finger or pen to a personal computer, and particularly to a coordinate input device which can perform a cursor position control by dragging a finger on an operation surface to input the coordinate and which can perform a switching input operation from the operation surface.

2. Description of the Related Art

It has been widely known that such a coordinate input device uses as a tablet which can detect the coordinate position of a control member such as a finger on an operation plate in response to, for example, a change in an amount of a received light or an electrostatic capacitance. The tablet is a detecting device in a flat shape which detects a coordinate position of a control member every a predetermined short sampling period of time and issues the detection signal to a computer body. The position of the cursor displayed on a display screen can be controlled by dragging the control member (usually, an operator's finger) on the operation surface of the tablet. When an operator touches his finger against the operation surface of the tablet and moves it in the same direction as a direction of the cursor to be moved and by a predetermined movement thereof, a computer issues a control signal to move the cursor on the display screen. In this case, the movement and the moving direction of the cursor can be determined in accordance with the coordinate change of the finger on the operation surface.

Since the operation surface of a tablet is generally much smaller than the screen of a conventional display, the movement of the cursor is determined by multiplying the movement of a control member (finger) by a predetermined qualified value. If the qualified value is constant, the dragging operation on the operation surface is complicated when a cursor is moved largely or finely on a display. For that reason, a current cursor control device using a tablet detects the moving rate of a control member based on a coordinate change of the control member every sampling time, whereby it determines coarsely the qualified value when the moving rate is large or determines finely the qualified value when the moving rate is small. As described above, the qualified value which is a coefficient for converting the movement of a control member into a cursor movement increases and decreases in accordance with the moving rate of the control member. Therefore an operator can control the position of the cursor with the movement quite larger than that of a finger by moving swiftly it on the operation surface when he wants to move largely the cursor on a display screen. In similar manner, an operator also can control the position of the cursor at the same movement as that of his finger by moving slowly his finger on the operation surface when he wants to move finely the cursor on a display screen.

The conventional cursor control device where a qualified value (conversion coefficient) is varied in accordance with the moving rate of a control member on the operation surface of a tablet can improve its operability in comparison with a fixed qualified value using device. However, actually, it is not easy to vary properly the moving rate of the control member such as a finger on an operation surface. The operability is not necessarily good because it is unexpectedly difficult to control the moving rate of the control member. Particularly, with a narrow operation surface of a tablet because of a limited space, it is more difficult to control the moving rate of the control member through the qualified value must be varied largely, thus causing poor operability.

The above tablet can input coordinates to a personal computer. However, when an icon at a specified position on a display is selected, a special pen with a switch mounted on its tip thereof must be used or a push-button switch mounted separately from the operation surface for coordinate inputting must be depressed after the finger inputting a coordinate has been left off from the operation surface. Accordingly, the conventional tablet provides poor operability.

SUMMARY OF THE INVENTION

The present invention is made to overcome the above problems. An object of the present invention to provide a coordinate input device with good operability.

An another object of the present invention is to provide a coordinate input device which can prevent an erroneous switching input operation and can perform a reliable switch input operation only when a switching operation has been performed intentionally in various operating states according to actually measured data regarding a touch pressure and an operation movement.

According to the present invention, the coordinate device wherein when a control member such as a finger is moved on an operation surface, a signal corresponding to the direction and movement thereof are issued to a computer body to control the position of a cursor on a display is constituted of an operation plate having the operation surface; an operation pressure detecting means having a pressure-sensitive sensor arranged on the back surface of the operation plate, for detecting the touch pressure of the control member in use; and an arithmetic circuit for calculating the coordinate position and moving rate of the control member based on a detection signal from the operation pressure detecting means, and for calculating the movement of the cursor in accordance with a first qualified value and a second qualified value, the first qualified value being determined based on the movement and moving rate of the coordinate position, the second qualified value being determined based on the touch pressure of the control member.

The cursor control device is constituted of a coordinate input unit including an operation plate having a control plate for dragging a control member such as a finger, a substrate arranged on the back surface of the control plate and having a pressure sensitive sensor for detecting a touch pressure of the control member, and a CPU arranged on the substrate for calculating the variation and the moving rate of a coordinate position based on a detection signal from said pressure sensitive sensor; a keyboard input device having an input port portion for receiving a signal from the coordinate input unit; a computer body connected to the keyboard input device; and a display connected to the computer body for displaying the movement of the cursor in accordance with an input signal from the coordinate input unit.

A coordinate input device according to the present invention is constituted of an operation plate having an operation surface where a touch pressure is applied; a pressure detecting means arranged on the back surface of the operation plate; a pressure position detecting means for detecting the coordinate of a touch point on the operation plate; a comparison means for comparing a movement, a touch pressure value, or a time variation in pressure value of the coordinate with a prescribed value for the movement, the pressure value, or the time variation in pressure; a judging means for selecting a switching operation or non switching operation by the comparison means; and a switching signal generating means for generating a switching signal by means of the judging means.

A control member such as a finger can be swiftly moved on an operation surface when the touch pressure against the operation surface is weak. On the contrary, a control member can be slowly moved on the operation surface when the touch pressure against the operation surface is strong. An operator's natural motion depends on qualified values, thus controlling the position of the cursor easily in comparison with the conventional device where a qualified value is determined only by the movement of a control member. The qualified value which is a coefficient to convert the movement of a control member into a cursor movement is determined as a function (for example, a product) of a first qualified value and a second qualified value. The first qualified value is set so as to increase or decrease in accordance with the movement of a control member. The second qualified value is set so as to increase as the touch pressure of a control member decreases. When the operation surface has a small area, the touch pressure of the control member can be controlled. It is expected that good operability is obtained because the second qualified value can be varied suitably.

It is judged that a switch input is not intended when an operator depresses strongly an operation surface unintentionally even if the touch pressure or a change in time of the touch pressure exceeds a predetermined value. As a result, an operator cannot perform unintentionally a switch inputting. After the processing means judges that a switching input has been performed, the switching input is held when the movement of the coordinate exceeds a predetermined value. Even if a finger strikes the end of the operation surface while performing a switching input operation, the switching input is in a holding state. Hence after a finger is lifted off from the operation surface, the dragging operation can be continuously carried out by touching the operation surface to perform a switch inputting.

BRIEF DESCRIPTION OF THE DRAWINGS

The present invention will hereinafter be explained in more detail with reference to the attached drawings, wherein.

DESCRIPTION OF THE PREFERRED EMBODIMENTS

A preferred embodiment of the coordinate input device according to the present invention will be explained below in accordance with FIGS. 1 through 6.

Figure 1:
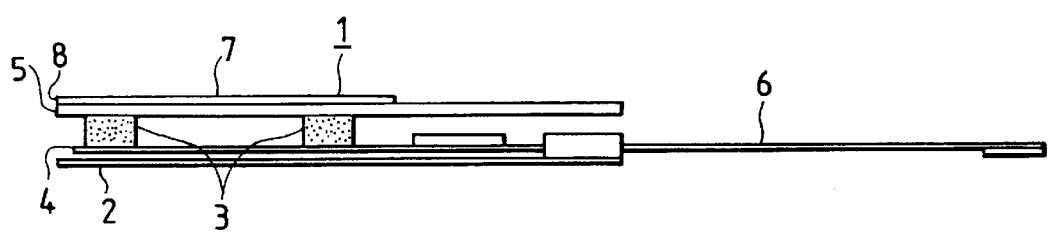
FIG. 1 is a cross sectional view showing a pointing device according to the present invention.
Figure 2:
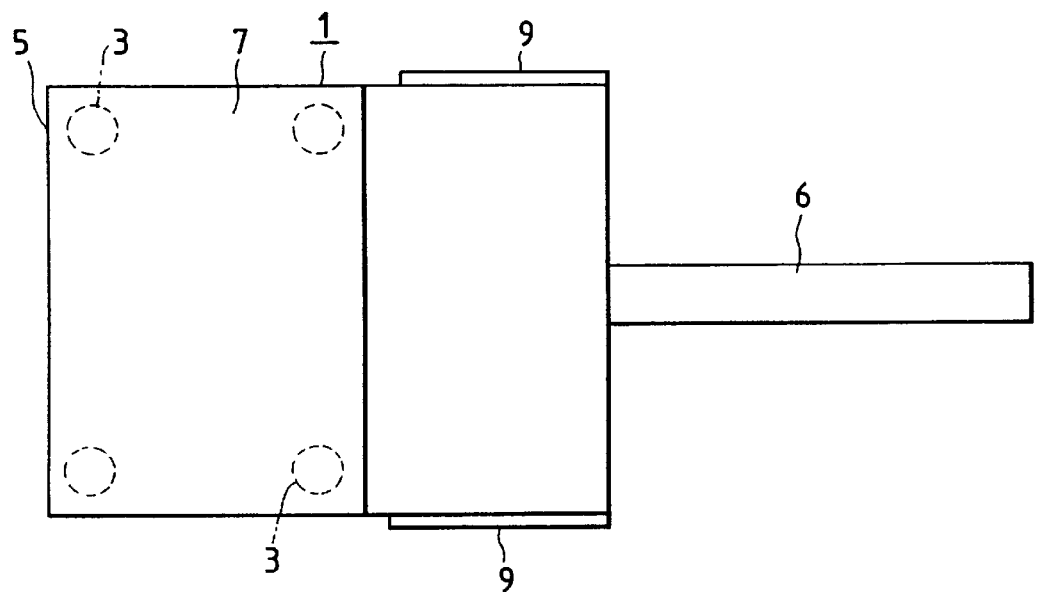
FIG. 2 is a plan view showing the pointing device according to the present invention.
Figure 3:
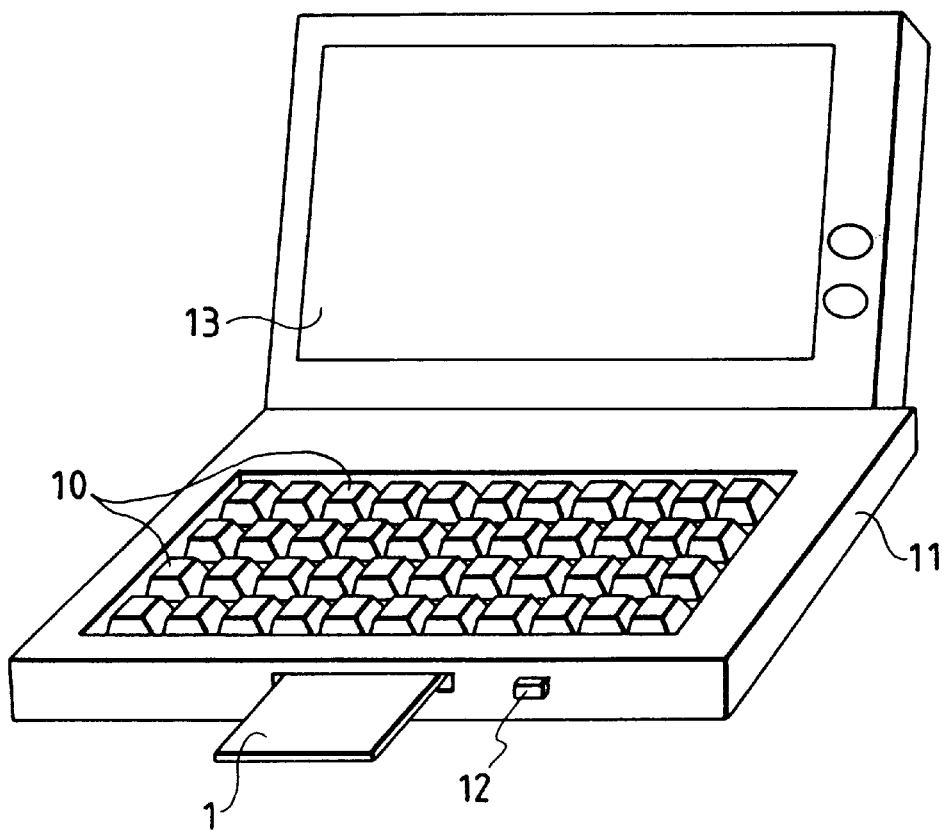
FIG. 3 is an external view showing a portable personal computer mounting the pointing device according to the present invention.
Figure 4:
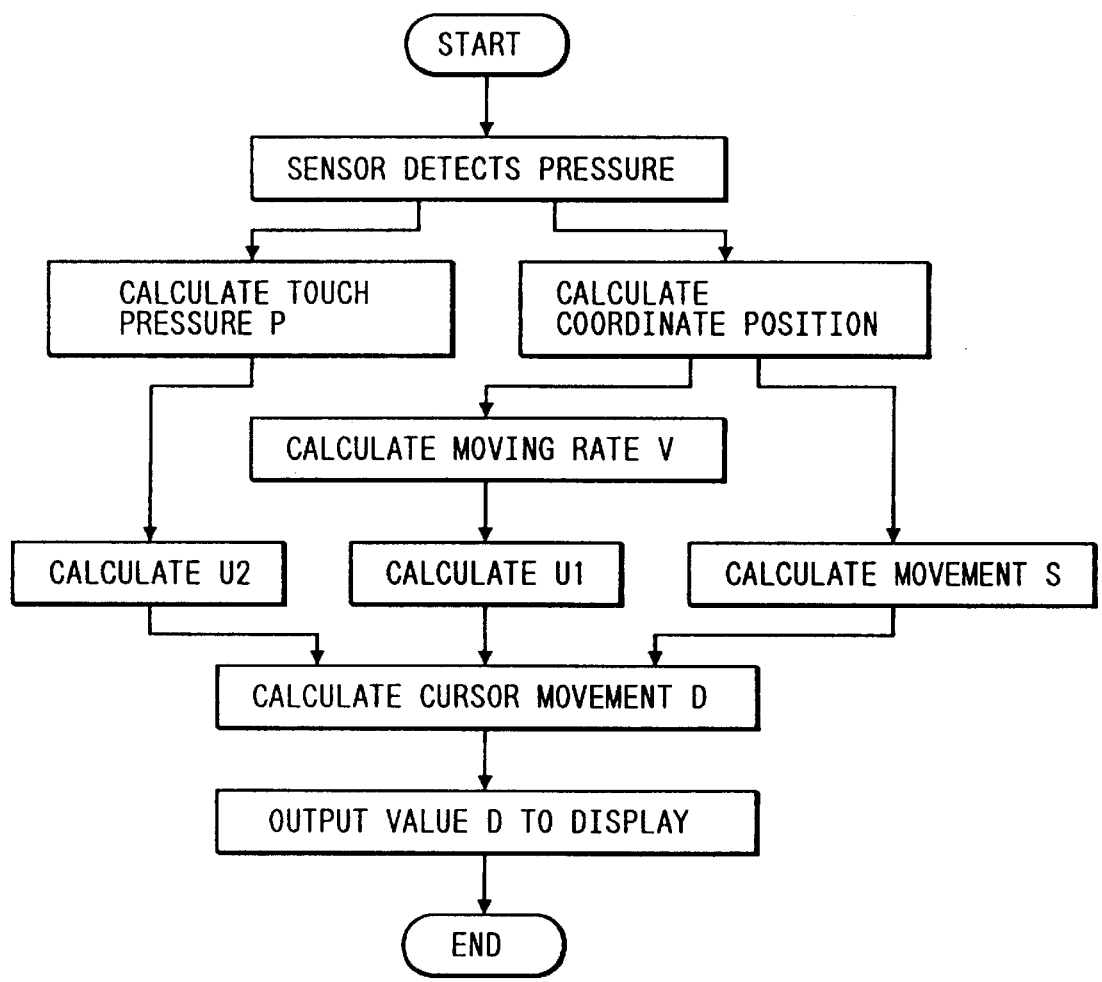
FIG. 4 is a flowchart showing an arithmetic processing routine in an arithmetic circuit according to the present embodiment.
Figure 5:
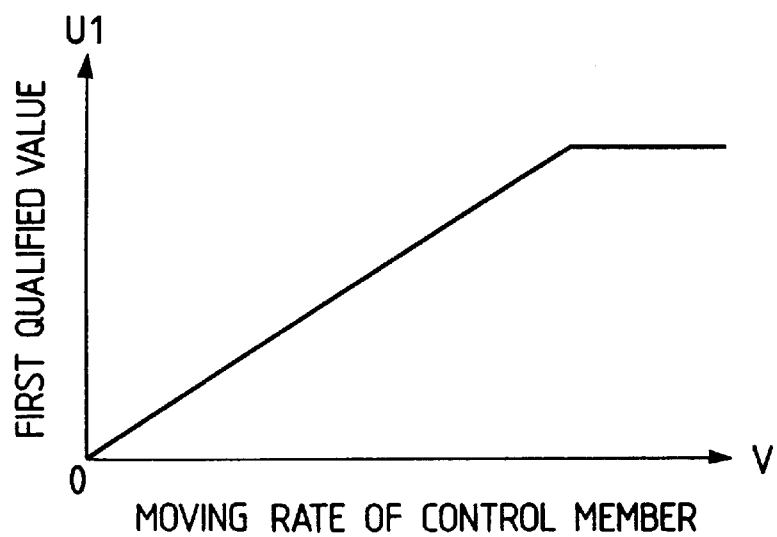
FIG. 5 is a graph showing first qualified values obtained by calculating the moving rate of a control member using the arithmetic circuit.
Figure 6:
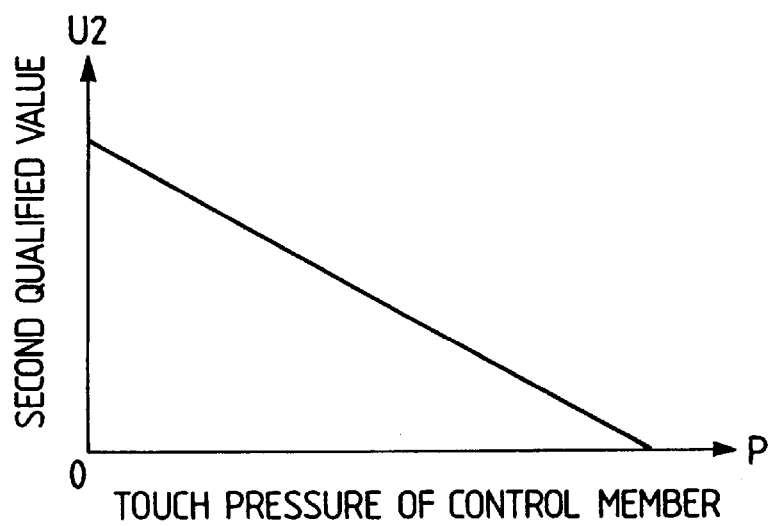
FIG. 6 is a graph showing second qualified values obtained by calculating the touch pressure of a control member using the arithmetic circuit.

FIG. 1 is a cross sectional view showing a pointing device according to the present embodiment. FIG. 2 is a plan view showing the pointing device. FIG. 3 is an external view showing a pointing device built-in portable personal computer. FIG. 4 is a flowchart showing arithmetic processing routine of an arithmetic circuit in the embodiment. FIG. 5 is a characteristic diagram graphing first qualified values obtained by calculating moving rates of a control member by means of an arithmetic circuit. FIG. 6 is characteristic diagram graphing second qualified values obtained calculating touch pressures of a control member by means of an arithmetic circuit. FIG. 7 is a diagram illustrating an input/output operation of the pointing device according to the present embodiment.

Figure 8:
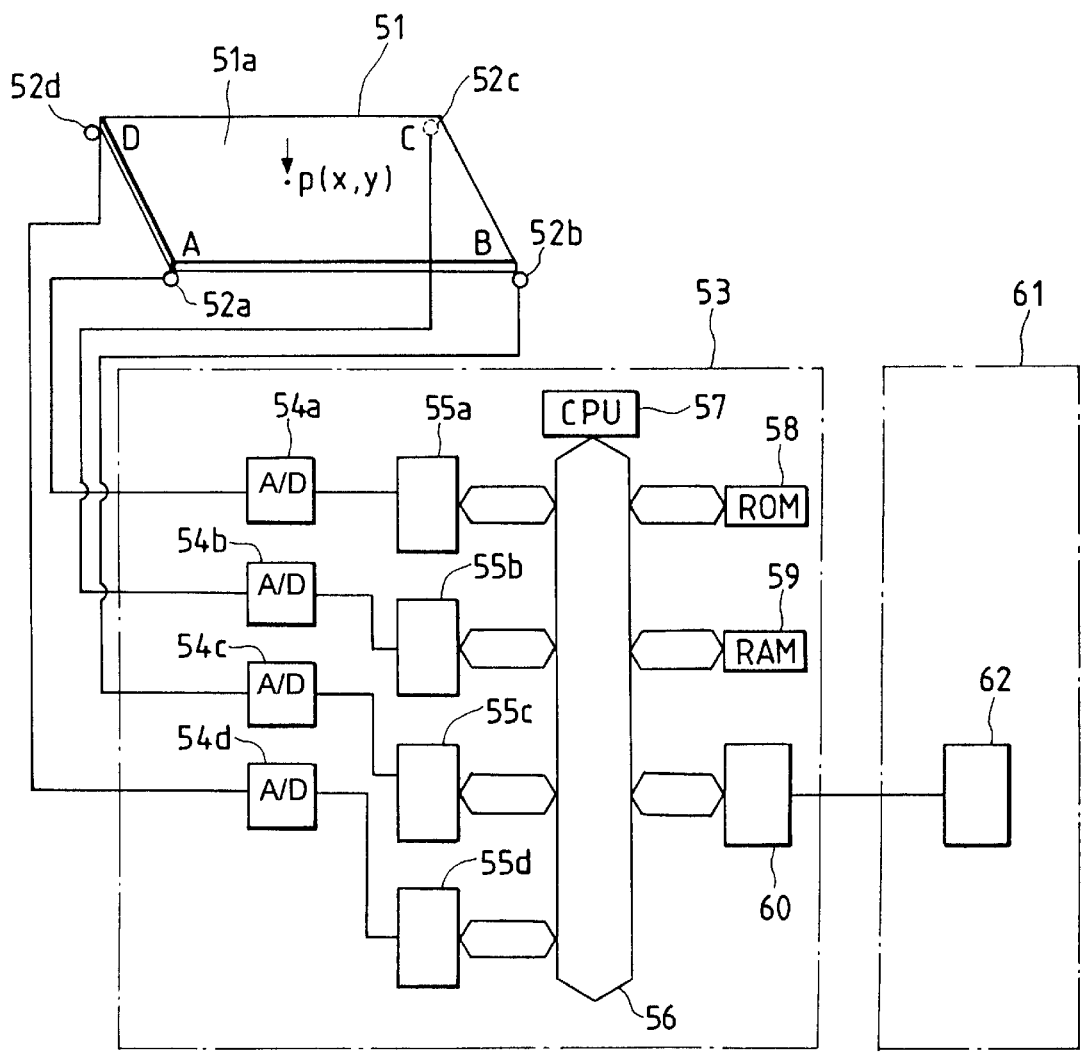
FIG. 8 is a block diagram showing structurally an embodiment of the coordinate input device according to the present invention.
Figure 9A:
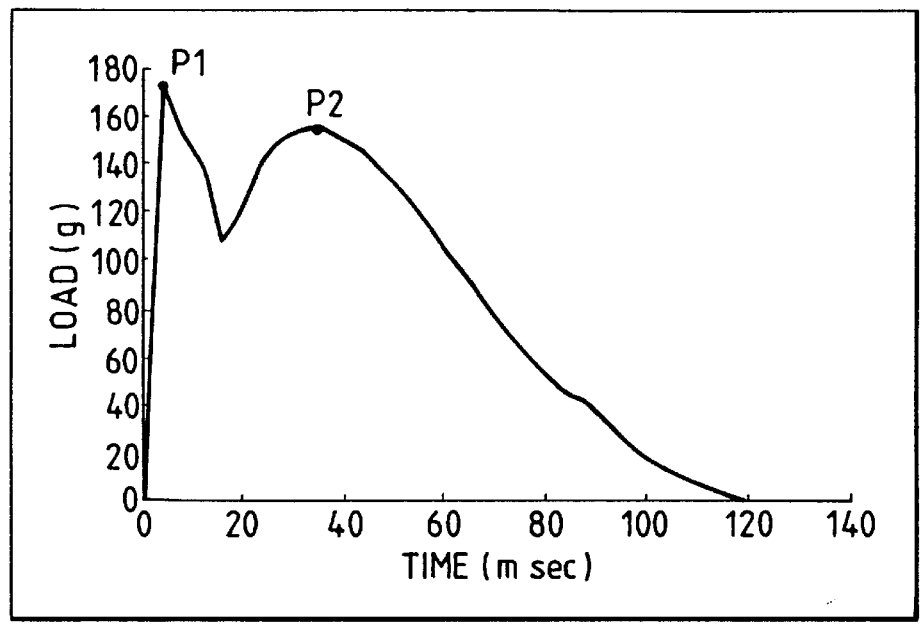
FIGS. 9(i a) and 9(b) show data actually measured when an operation surface is touched to perform intentionally a switching input operation, FIG. 9(a) being a graph showing the relationship between time and touch pressure, and 9(b) being a graph showing the relationship between time and movement.
Figure 9B:
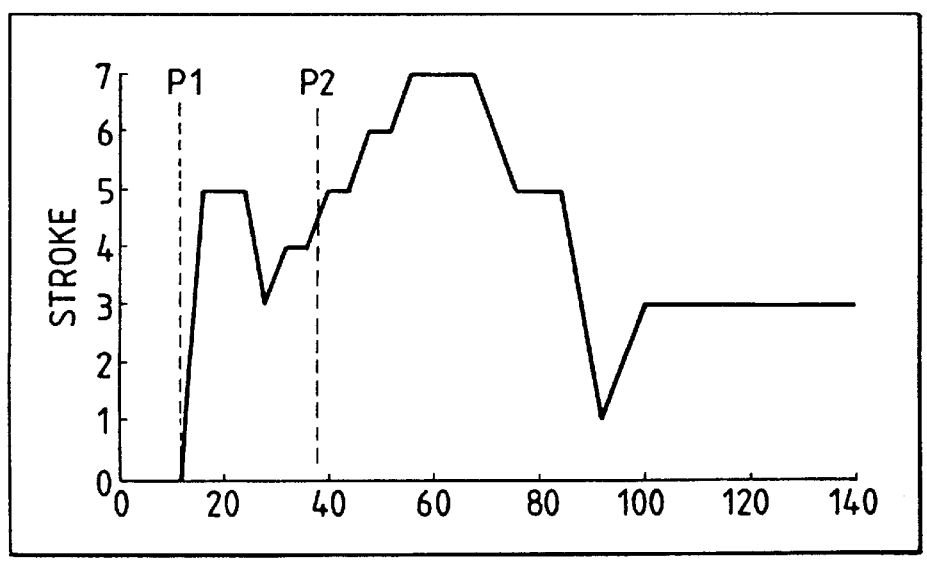
Figure 10A:
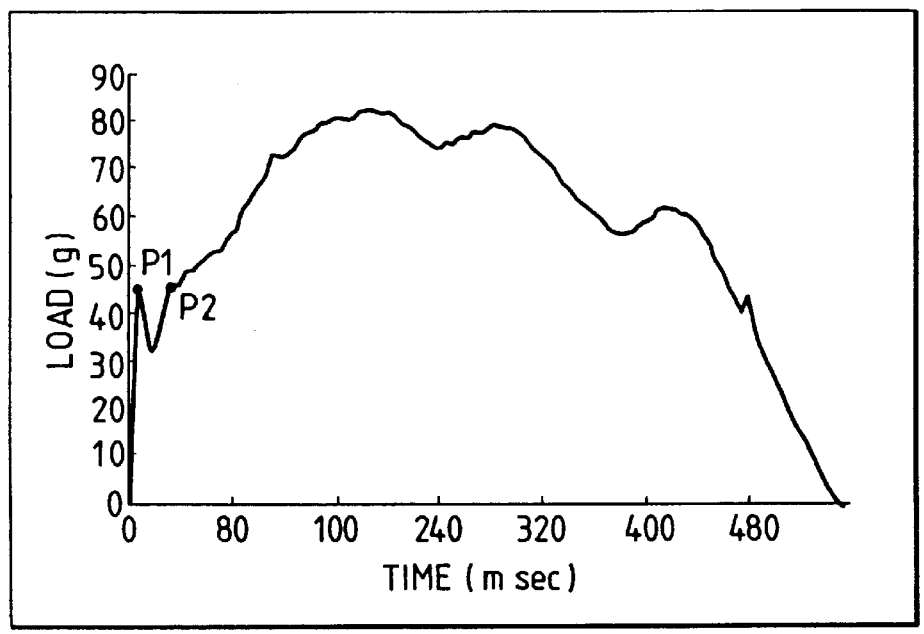
FIGS. 10(a) and 10(b) show data actually measured when an operation surface is touched without any intention to perform a switching input operation, FIG. 10(a) being a graph showing the relationship between time and touch pressure, and FIG. 10(b) being a graph showing the relationship between time and movement.
Figure 10B:
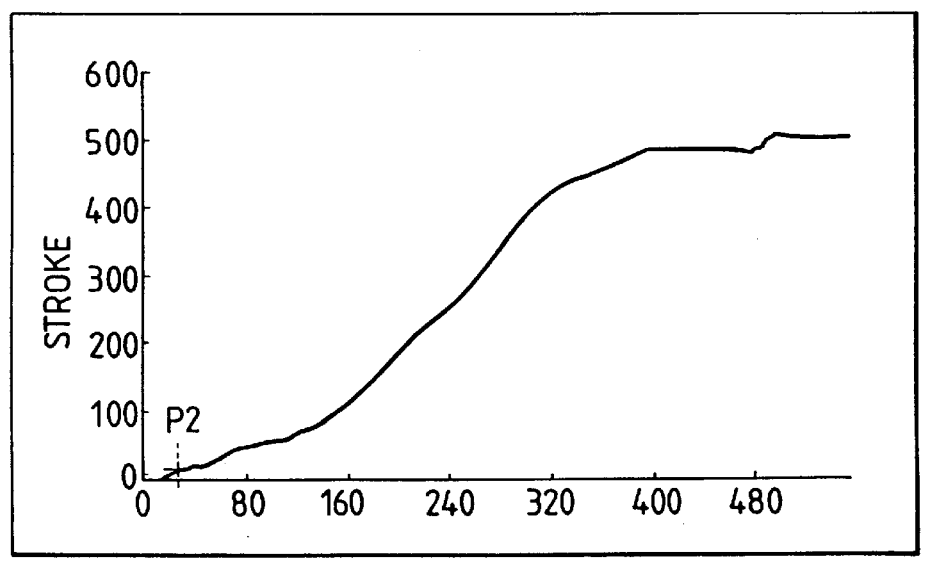
Figure 11:
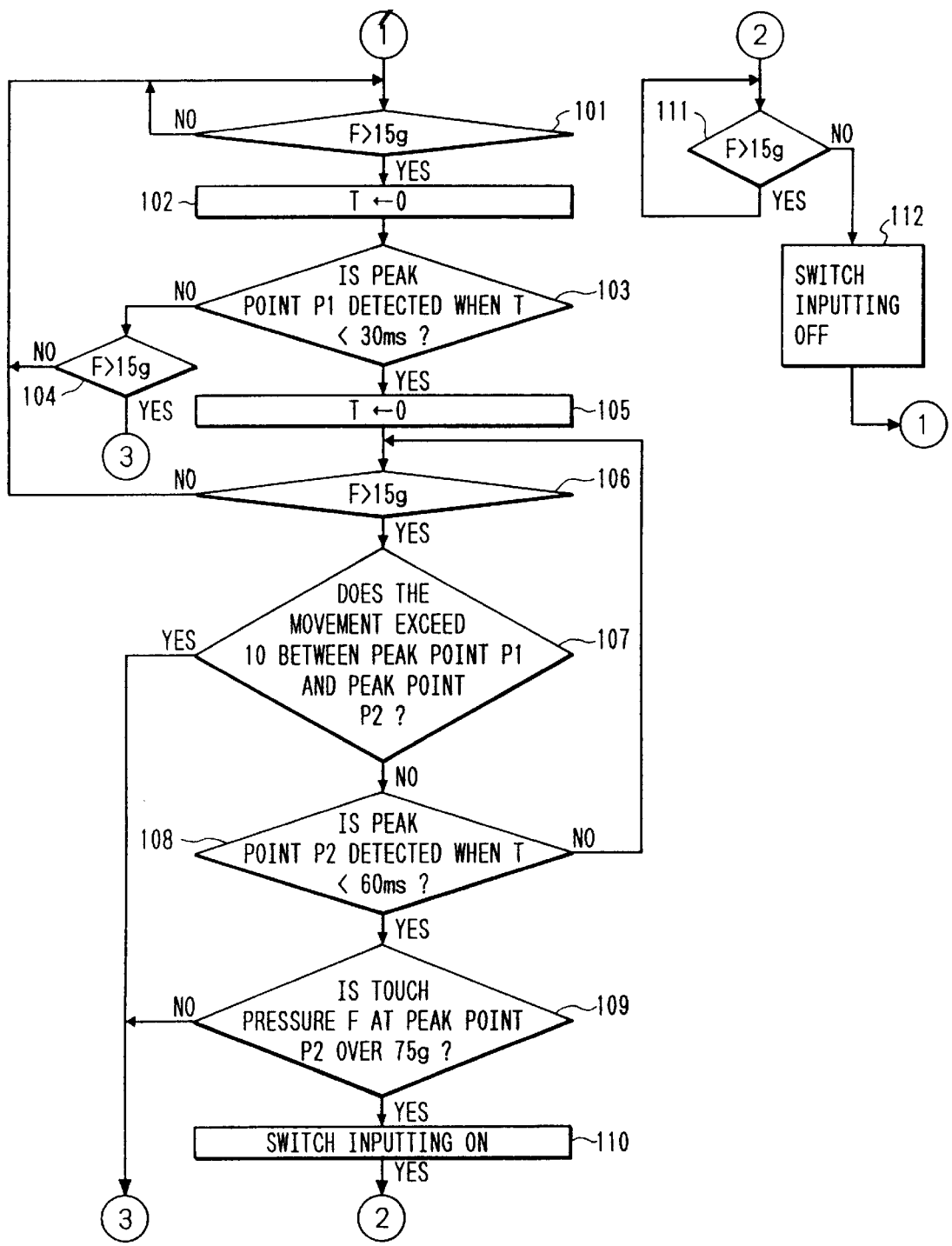
FIG. 11 is a flowchart showing the processing steps according to the first embodiment of the present invention.
Figure 12A:
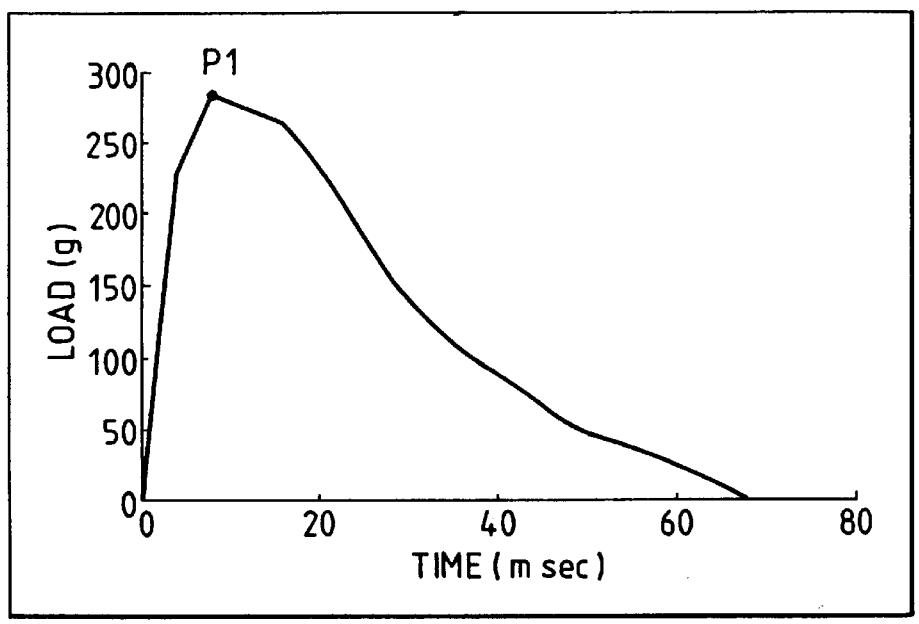
FIGS. 12(a) and 12(b) show data actually measured when a hard thing such as a pen is touched to an operation surface to perform intentionally a switching input operation, FIG. 12(a) being a graph showing the relationship between time and touch pressure, and FIG. 12(b) being a graph showing the relationship between time and movement.
Figure 12B:
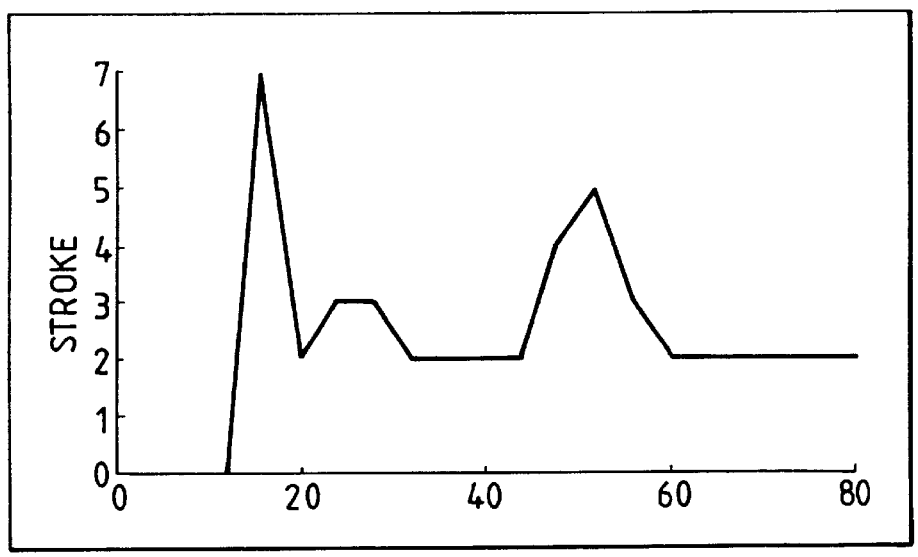
Figure 13A:
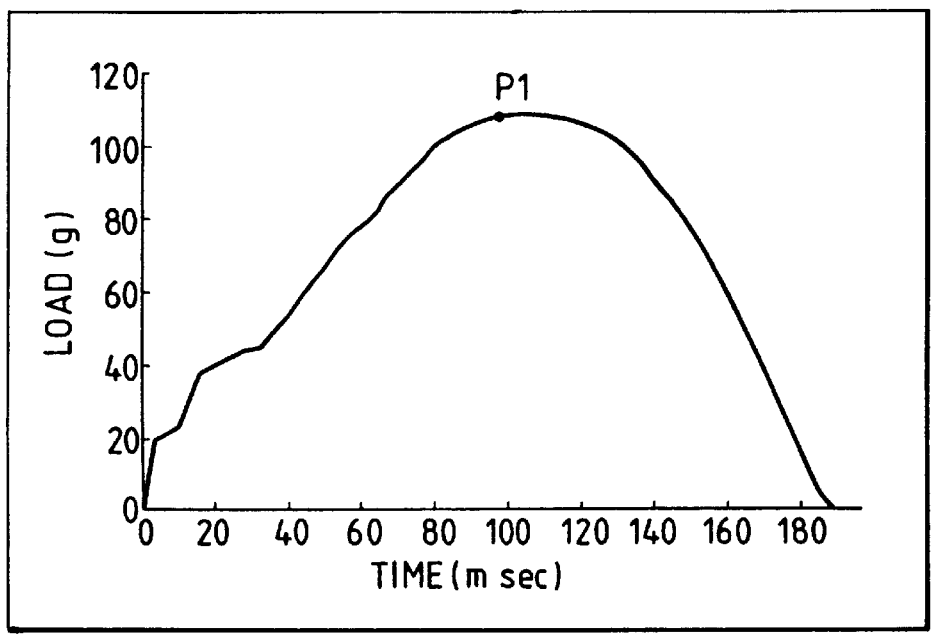
FIGS. 13(a) and 13(b) show data actually measured when a hard thing such as a pen is moved on an operation surface without any intention to perform a switching input operation, FIG. 13(a) being a graph showing the relationship between time and touch pressure, and FIG. 13(b) being a graph showing the relationship between time and movement.
Figure 13B:
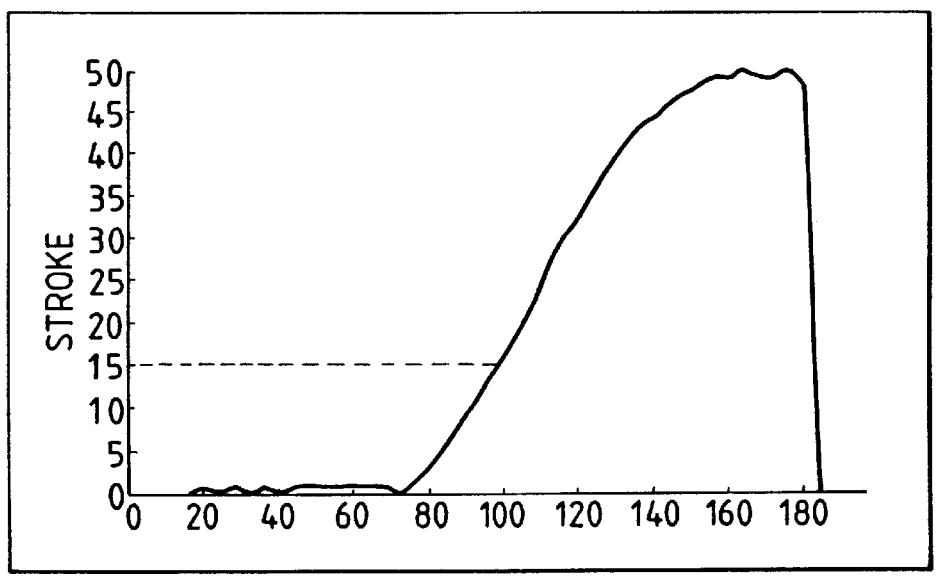
Figure 14:
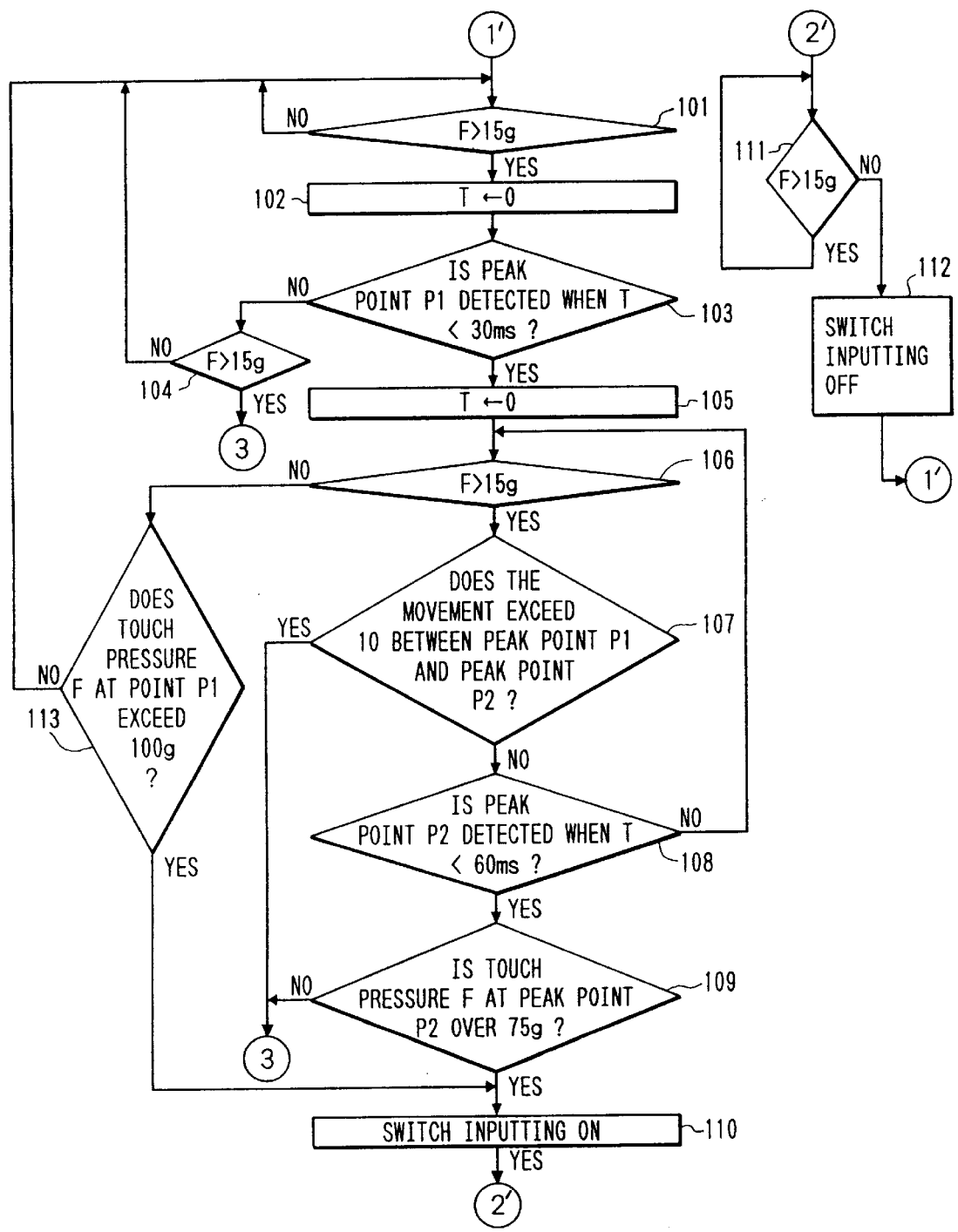
FIG. 14 is a flowchart showing the processing steps according to the second embodiment of the present invention.
Figure 15A:
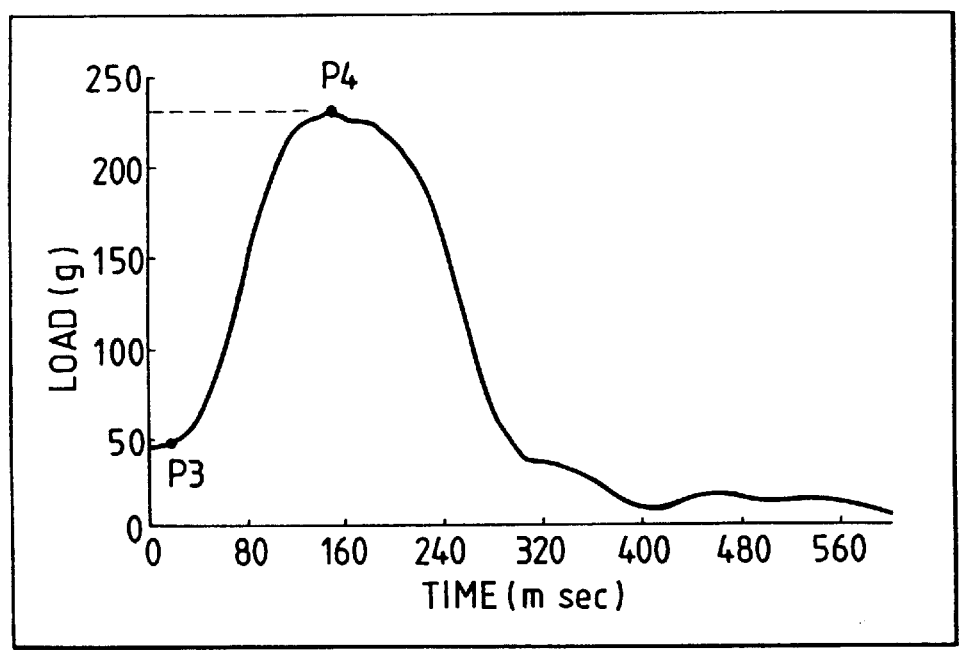
FIGS. 15(a) and 15(b) show is a flowchart showing data actually measured when a finger is moved on an operation surface to perform intentionally a switching input operation, FIG. 15(a) being a graph showing the relationship between time and touch pressure, FIG. 15(b) being a graph showing the relationship between time and movement.
Figure 15B:
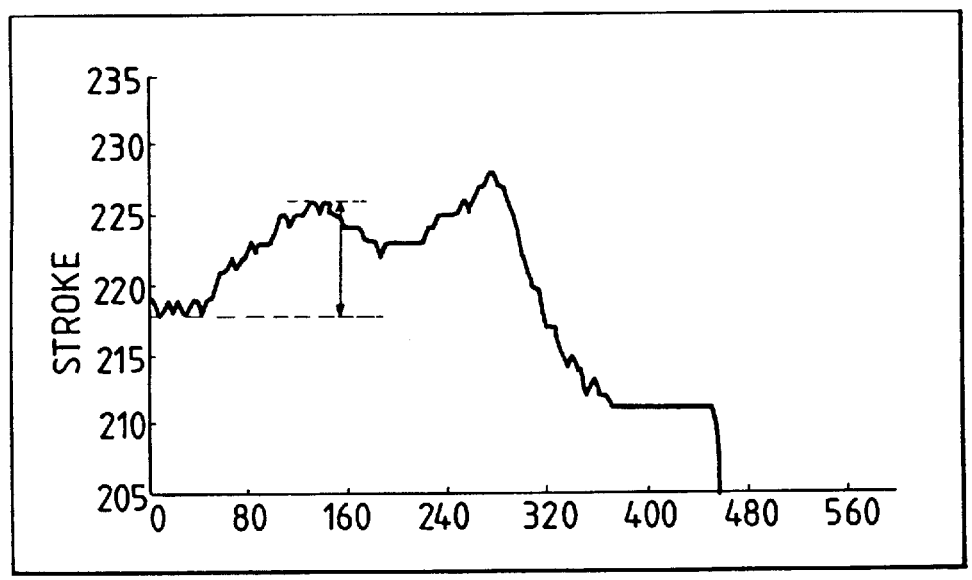
Figure 16A:
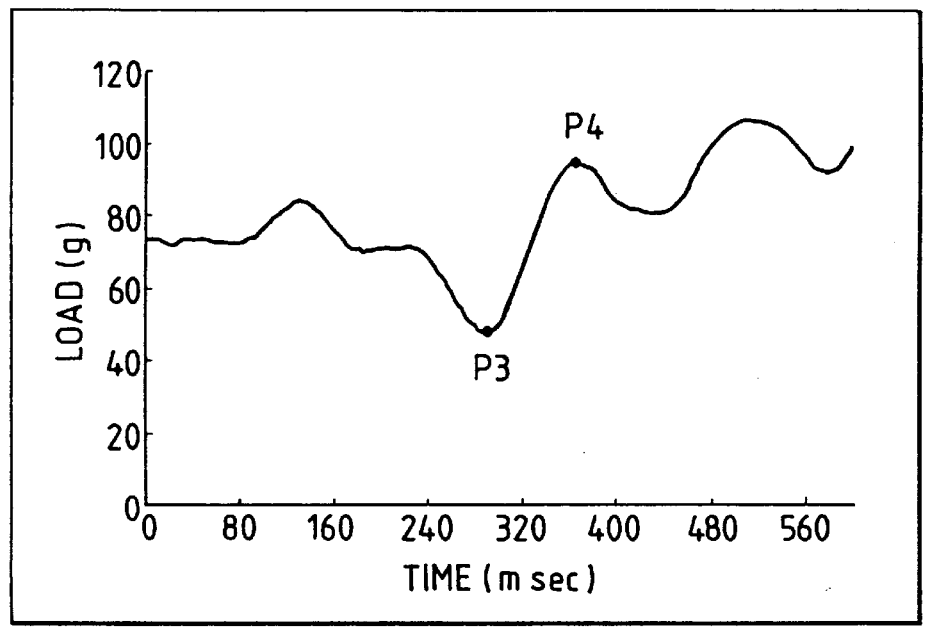
FIGS. 16(a) and 16(b) show is shows data actually measured when a finger is moved on an operation surface without any intention to perform a switching operation, FIG. 16(a) being a graph showing the relationship between time and touch pressure, FIG. 16(b) being a graph showing the relationship between time and movement.
Figure 16B:
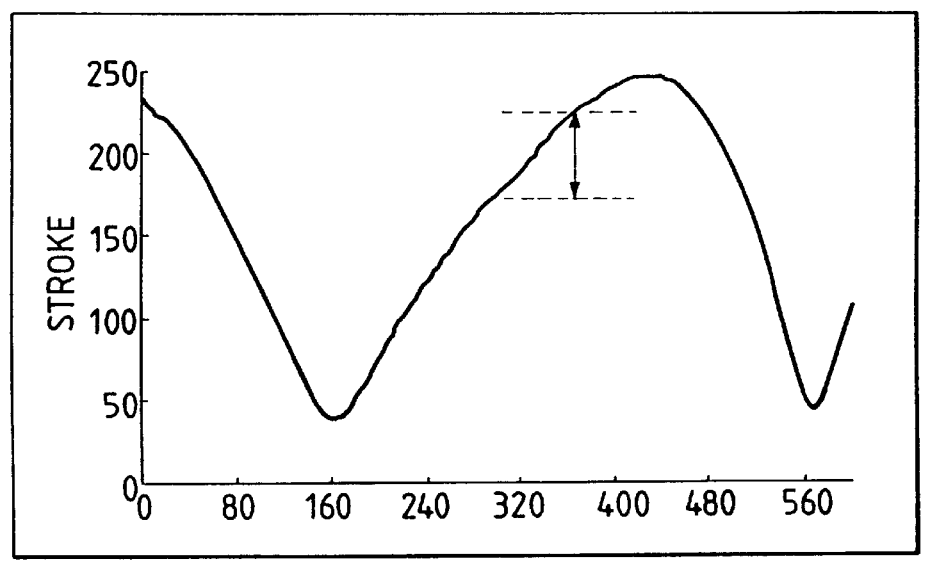
Figure 17:
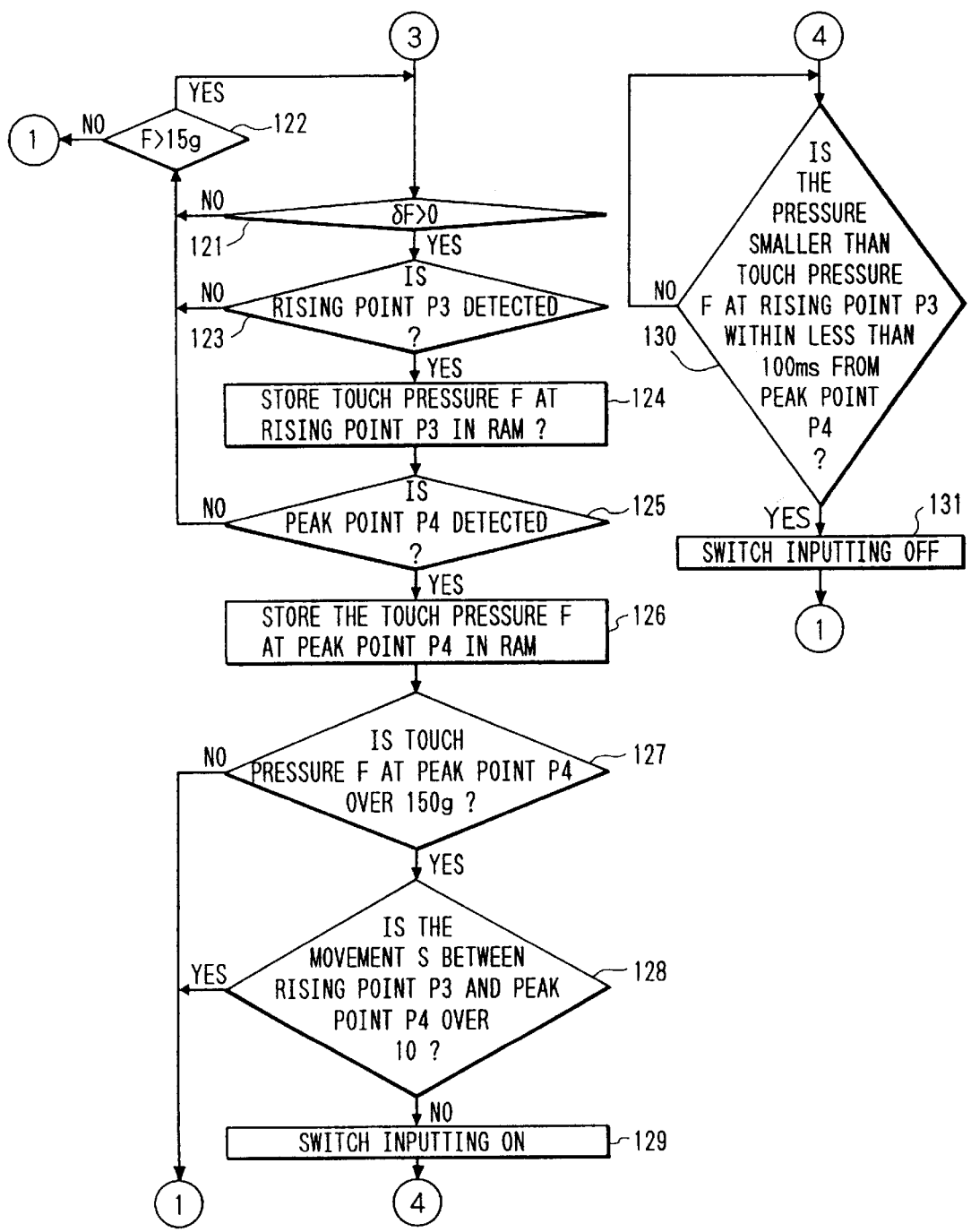
FIG. 17 is a flowchart showing the processing steps according to the third embodiment of the present invention.
Figure 18A:
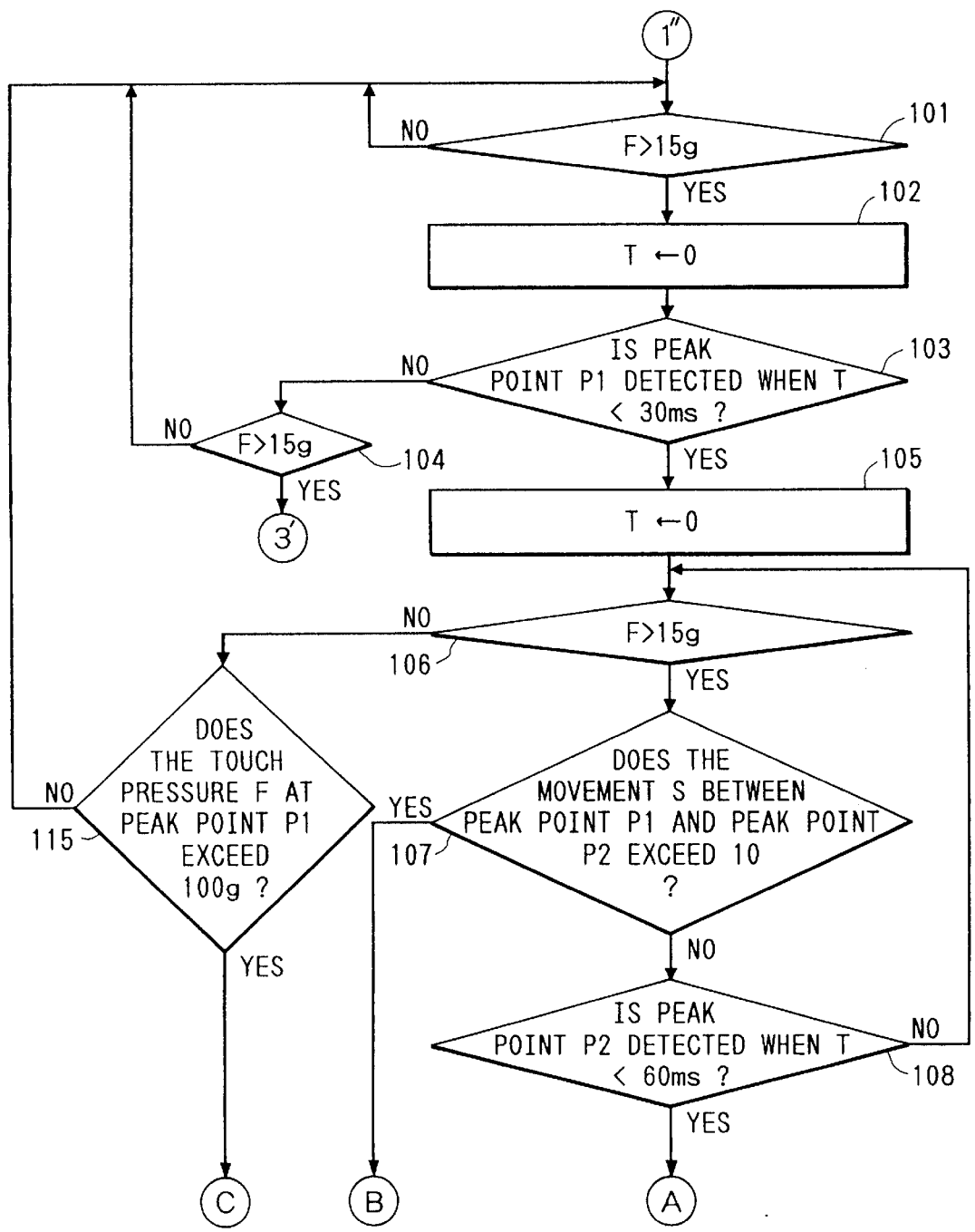
FIGS. 18(a) and 18(b) are flow charts showing the processing steps according to the fourth embodiment of the present invention.
Figure 18B:
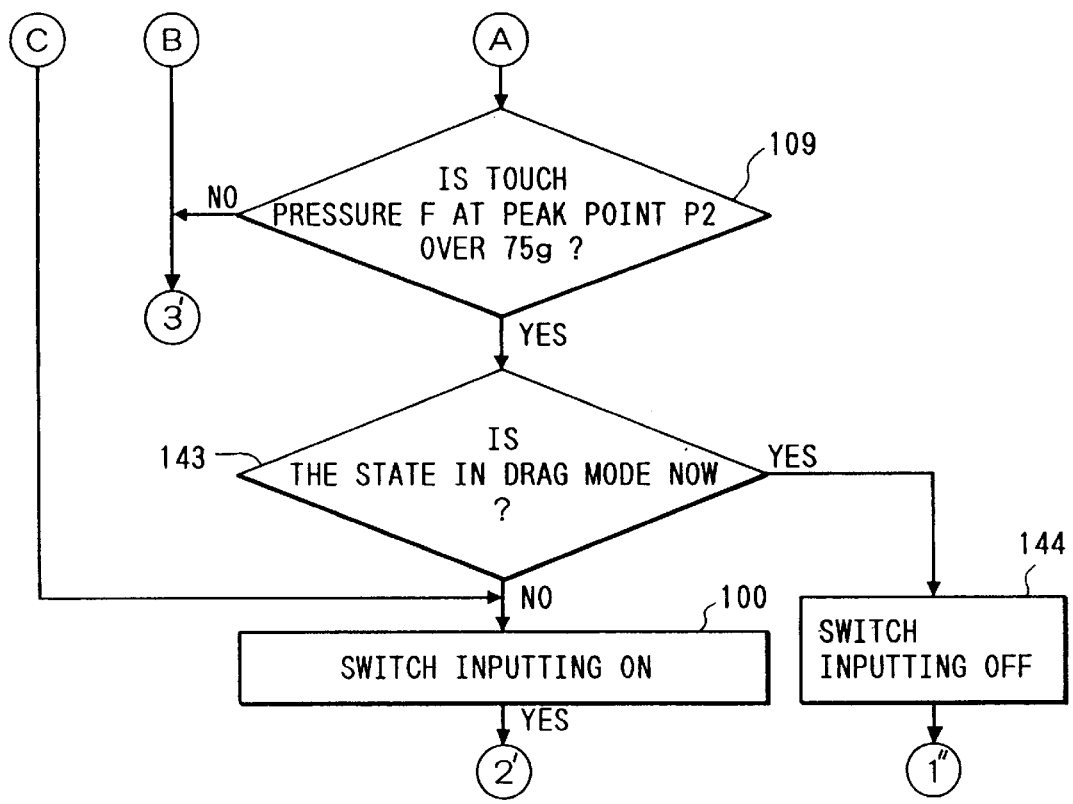
Figure 18B:
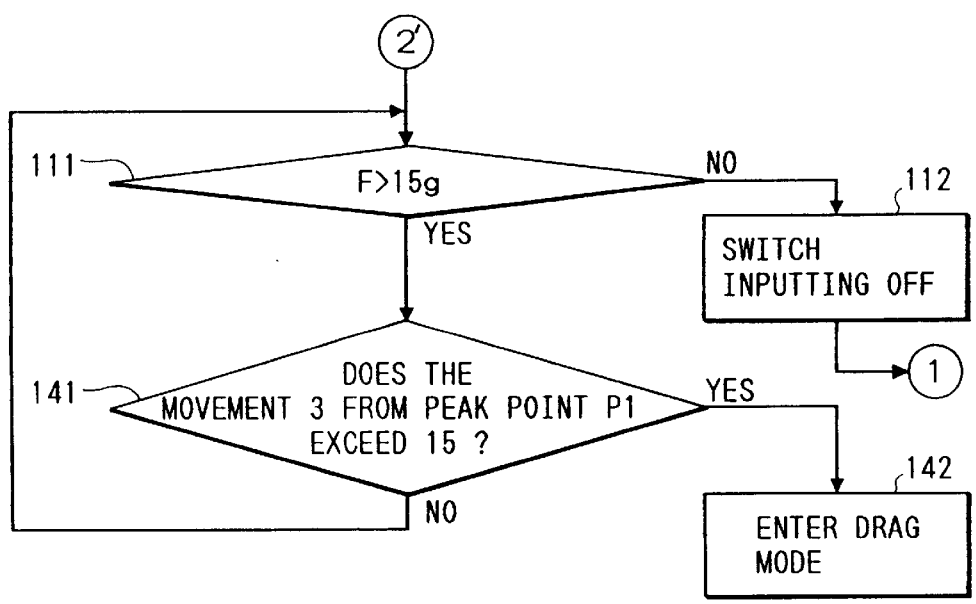
Figure 19A:
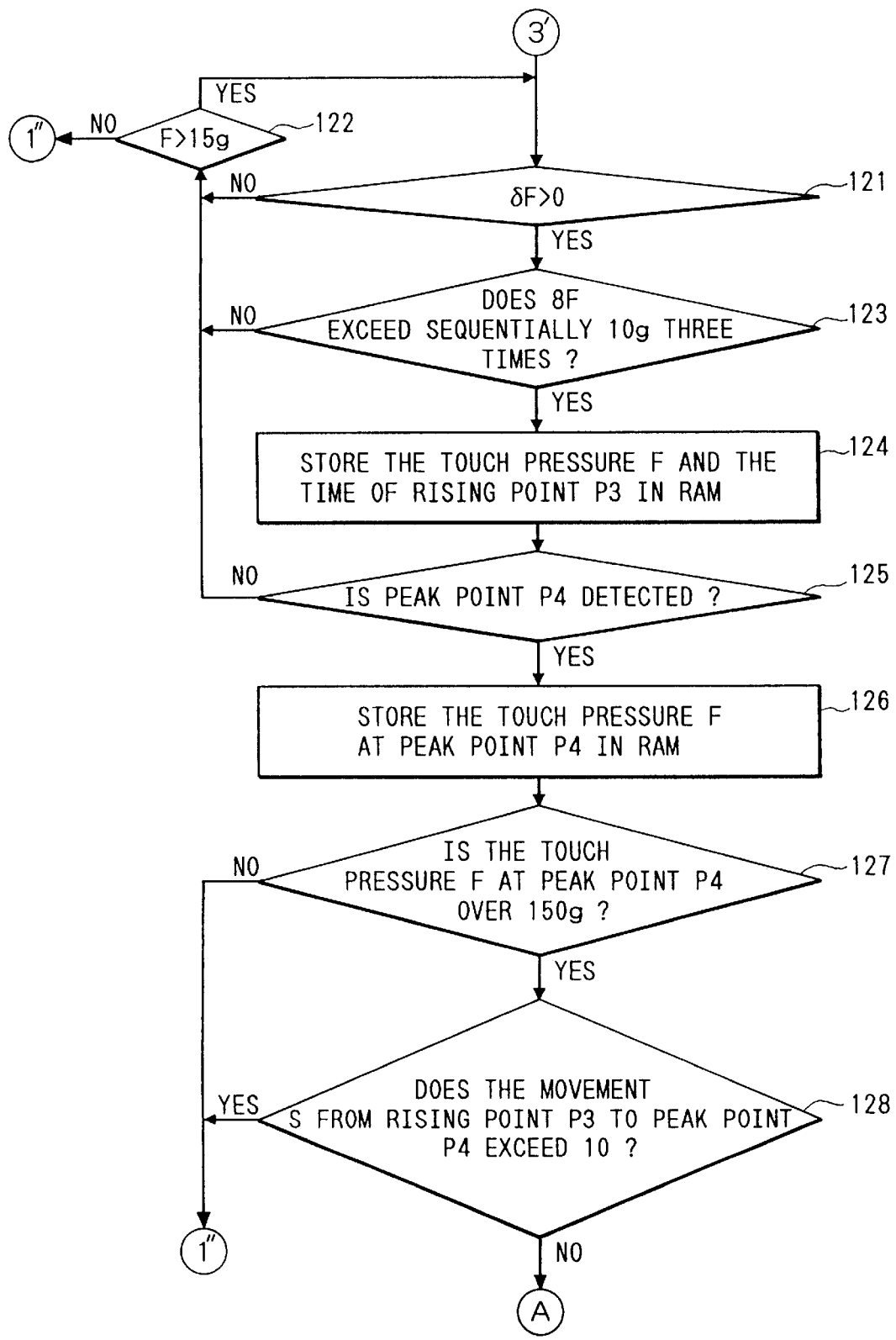
FIGS. 19(a) and 19(b) are flow charts showing the processing steps according to the fifth embodiment of the present invention.
Figure 19B:
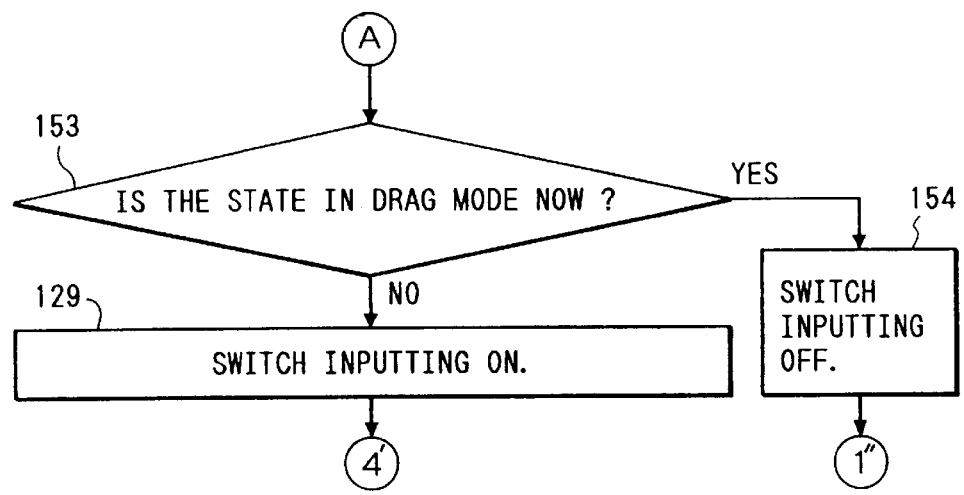
Figure 19B:
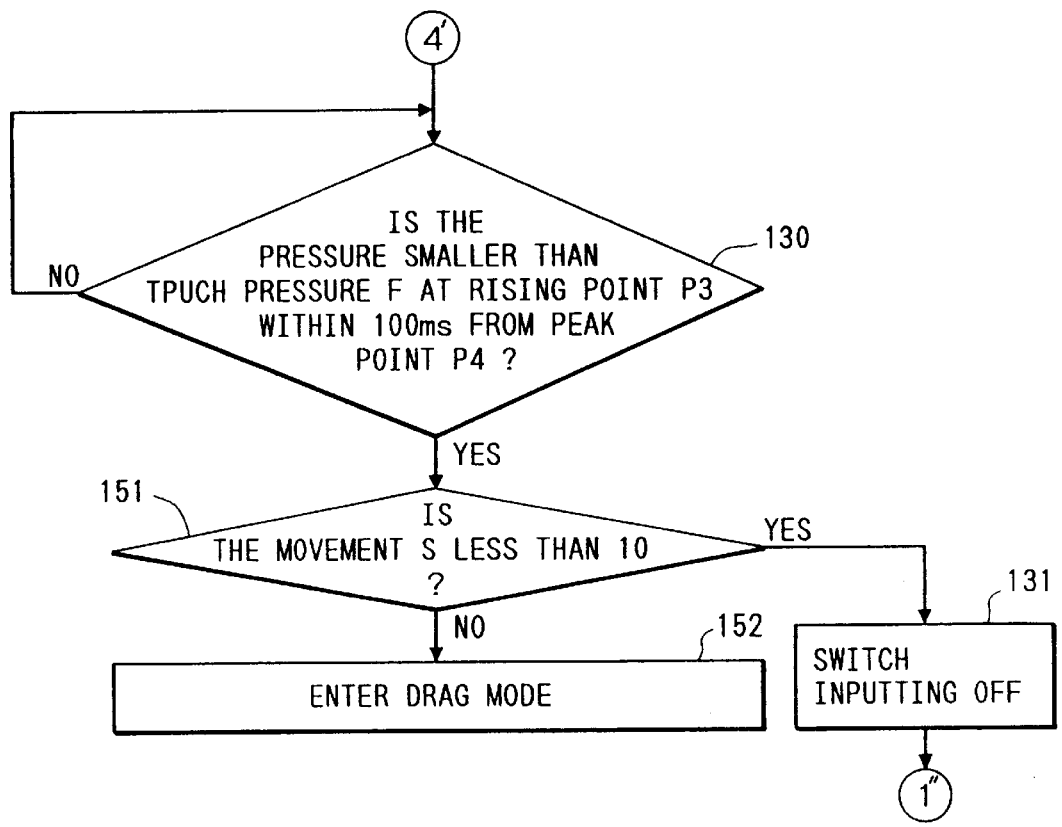

FIG. 8 is a block structural diagram showing the coordinate input device according to the present invention. FIGS. 9(a) and 9(b) show actual data obtained by touching intentionally the operation surface 51a to perform a switching input. FIG. 9(a) is a graph showing a time vs touch pressure characteristic and FIG. 9(b) is a graph showing a time vs movement characteristic. FIGS. 10(a) and 10(b) show actual data obtained by touching intentionally the operation surface 51a to perform a moving operation without a switching input. FIG. 10(a) is a graph showing a time vs touch pressure characteristic. FIG. 10(b) is a graph showing a time vs movement characteristic. FIG. 11 is a flowchart showing the processing steps according to the first embodiment of the present invention. FIGS. 12(a) and 12(b) show actual data measured when the operation surface 51a is touched using a hard material such as a pen to perform a switching input intentionally. FIG. 12(a) is a graph showing a time vs pressure characteristic and FIG. 12(b) is a graph showing a time vs movement characteristic. FIGS. 13(a) and 13(b) show actual data measured when the operation surface 51a is touched with a hard thing such as a pen, with an intention to perform only a moving operation without performing a switching input. FIG. 13(a) is a graph showing a time vs pressure characteristic and FIG. 13(b) is a graph showing a time vs movement characteristic. FIG. 14 shows a flowchart showing the processing steps according to the second embodiment of the present invention. FIGS. 15(a) and 15(b) shows actual data measured when the operation surface 51a is touched with a finger, with an intention to perform a switching input. FIG. 15(a) is a graph showing a time vs touch pressure characteristic and FIG. 15(b) is a graph showing a time vs movement characteristic. FIGS. 16(a) and 16(b) shows actual data measured when a touch pressure is added to the operation surface 1a with a finger, without any intention to perform a switching input. FIG. 16(a) is shows a graph showing a time vs pressure characteristic and FIG. 16(b) shows a graph showing a time vs movement characteristic. FIG. 17 is a flowchart showing the processing steps according to the third embodiment. FIG. 18 is a flowchart showing the processing steps according to the fourth embodiment. FIG. 19 is a flowchart showing the processing steps according to the fifth embodiment.

Referring to now in FIGS. 1 and 2, a pointing device 1 includes a flexible print board 4 arranged fixedly over a metal plate 2 acting as a supporting plate. The flexible print board 4 mounts a pressure sensitive sensor 3 and other elements. A hard operation plate 5 is arranged on the pressure sensitive sensor 3. The flat cable 6 extending from the flexible print board 4 is connected to a computer 9 (not shown). The operation plate 5 has a rectangular operation surface 7 where an operator can touch with and drag on it with a control member such as a finger. A face sheet 8 is adhered to the operation surface 7. The pressure sensitive sensors 3 are arranged beneath the four corners of the rectangular operation surface 7, respectively. The four pressure sensitive sensors 3 support the operation plate 5. Guide rails 9 are arranged on both sides of the pointing device 1 to draw in and out a keyboard case mentioned later. The operation plate 5 is supported by an elastic member to tilt slightly in accordance with a finger pressure.

Figure 7A:
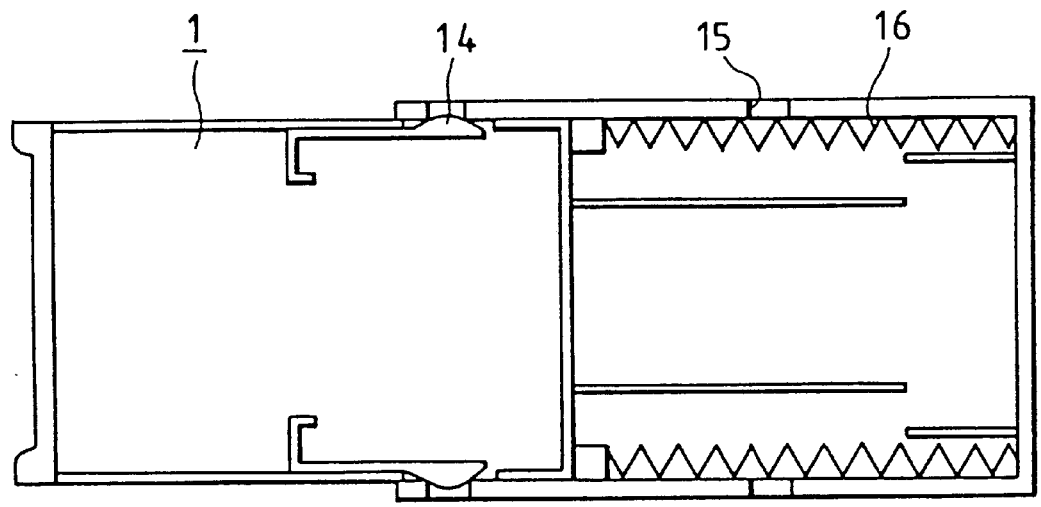
FIGS. 7(a) and 7(b) are diagrams illustrating an input/output operation of the pointing device according to the present invention.
Figure 7B:
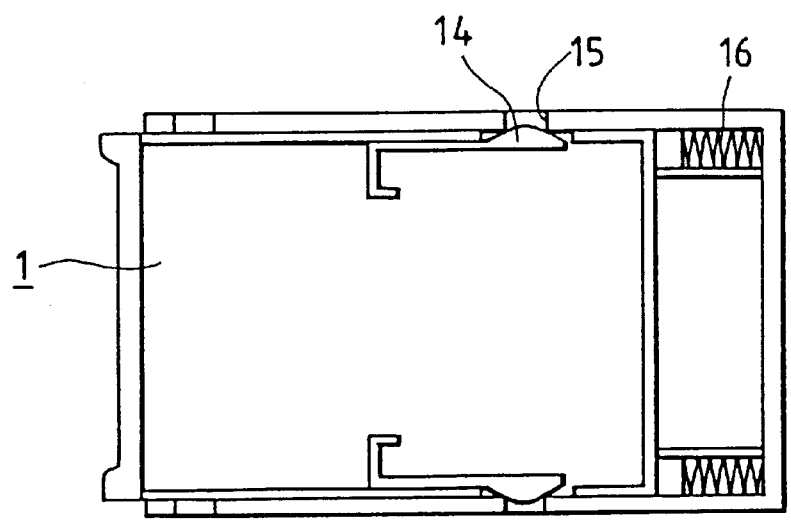

The pointing device 1, as shown in FIG. 3, can be structurally drawn out of and into the keyboard case 11 arranging many keys 10 on the top surface. The drawing operation is done along the rails 9. In concrete, as shown in FIGS. 7(a) and 7(b), when the lock releasing mechanism 12 is pushed into the keyboard case 11, the locking mechanisms 14 and 15 are released so that the pointing device 1 is protruded out in front of the keyboard case 11 due to the return force of the biased springs 16. When the pointing device 1 is pushed into the keyboard case 11 along the rails 9, the locking mechanism 14 and 15 are operated so that the pointing device 1 is housed inside the keyboard case 11. Since the pointing device 1 can be stored in the keyboard case 11 in no use, it is possible to miniaturize a portable personal computer.

In the pointing device 1 drawn out in front of the keyboard case 11 for use, when an operator touches his finger against the operation surface of the operation plate 5 and moves in a predetermined direction by a predetermined movement, each of the pressure sensitive sensors 3 transmits a signal corresponding to the finger pressure through the operation plate 5 to the computer in the keyboard case 11 via the flat cable 6. Hence the position of the cursor displayed on a display screen can be controlled.

Next, a detail explanation will be made below as for the cursor position control method employing the pointing device 1 with reference to FIGS. 4 to 6.

When an operator touches against the operation surface 7, the pressures of the respective pressure sensitive sensors 3 vary with his finger's position (pressure position). Hence the coordinate position (x, y) of a finger on the operation surface 7 is expressed by the following arithmetic formulas:

$$x=M\{(a+b)-(c+d)\}/(a+b+c+d)$$

$$y=N\{(a+b)-(b+c)\}/(a+b+c+d)$$

where a, b, c, and d are the outputs of the four pressure sensitive sensors 3, respectively, and M and N are proportional constants, respectively. The movement S of a finger on the pressure surface 7 can be detected as a perpendicular coordinate component corresponding to a moving direction. Furthermore, the moving rate V of a finger can be detected by the detected results. The touch pressure P against the operation surface 7 of a finger is expressed as the following formula:

$$p=K(a+b+c+d)$$

where K is a proportional constant.

When the movement S, moving rate V, and touch pressure P of a finger on the operation surface 7 are detected, the qualified value U which is a coefficient for converting the movement S of a finger into the movement of a cursor is determined as a product (U1×U2) of a first qualified value U1 determined in accordance with the moving rate V and a second qualified value U2 determined in accordance with the pressure P. That is, the qualified value U1, as shown by the graph in FIG. 5, is set so as to increase and decrease proportionally the moving rate V. The qualified value U2, as shown by the graph in FIG. 6, is set so as to increase as the touch pressure P decreases. The values U1 and U2 is multiplied by the movement S every sampling time while the movement D of the cursor is calculated as a perpendicular coordinate component corresponding to the moving direction. Namely, the movement D of a cursor is obtained by the following formula:

$$D = U \times s = U1 \times U2 \times s$$

The value D obtained is sent to the display 13 to move the cursor.

In the above embodiment, the qualified value U for converting the movement of a control member into the movement of a cursor is determined based on the first qualified value U1 determined according to the movement of a control member and the second qualified value U2 determined according to the pressure of the control member. When a control member is swiftly moved with a small touch pressure, the qualified value U becomes large, whereby a cursor can be moved coarsely on the display 13. On the contrary, when the control member is slowly moved with a large touch pressure, the cursor can be moved finely on the display 13. This means that an operator can control easily by weakening the touch pressure when an operation member such as a finger is moved at high speed. An operator can control easily by strengthening when a control member is moved at slow speed. Hence in comparison with the conventional device where a qualified value is determined only by the moving rate of a control member, an operator's natural motion can be reflected clearly by the qualified value U by determining a qualified value U as the product of U1 and U2, as shown in the above embodiment. As a result, the position of a cursor can be easily controlled while the operability can be improved.

As described in the above embodiment, since the pointing device 1 is mounted so as to be drawn in and out of a portable personal computer, the touch pressure of the operation surface 7 can be easily controlled even if the operation surface 7 with a small area makes it difficult to control the moving rate of a control member. Therefore the second qualified value U2 can be varied properly to provide good operability.

Next, the above embodiment will be explained in more detail as for its switching function.

The structure of the coordinate input device according to the present invention is explained with reference to FIG. 8. Piezoelectric elements 52a, 52b, 52c, and 52d for converting a pressure into a voltage are arranged at four corners A, B, C, and D of the back surface or the operation surface 51a of a rigid plate 51, respectively. The piezoelectric elements 52a, 52b, 52c, and 52d are connected to the analog-to-digital (a/d) convertors 54a, 54b, 54c, and 54d in the processing circuit 53, respectively. Those outputs of the a/d converters 54a, 54b, 54c, and 54d are connected to the input ports 55a, 55b, 55c, and 55d, respectively. The input ports 55a, 55b, 55c, and 55d are connected to the CPU 57 by way of the bus 56. The read-only memory (ROM) 58, the random access memory (RAM) 59, and the output port 60 are connected to the bus 56. The output 60 is connected to the input port 62 of the personal computer 61. In the coordinate input device structure, when the operation plate 51a of the rigid plate 51 is depressed with a finger or a pen, the a/d converters 54a, 54b, 54c, and 54d convert partial pressures applied to the four piezoelectric elements 52a, 52b, 52c, and 52d into digital values. The digital values are input to the input ports 55a, 55b, 55c, and 55d, respectively. The CPU 57 performs an arithmetic operation as for the depressed coordinate of the rigid plate 51 and outputs to the output port 60.

The CPU 57 performs an arithmetic processing for the coordinate detection according to the following steps: First it is assumed that the point A is an origin, the straight line AB is a X axis, and a straight line AD is a Y axis. The coordinate A is (0, 0), B is (L, 0), C is (L, H), and D is (H, 0), where L is the segment AB, and H is the segment AD.

If the point P (x, y) on the operation surface 51a is depressed with a touch pressure F, while the partial pressures at various points are fa, fb, fc, and fd the touch pressure F is given by the following expression:

$$F = fa + fb + fc + fd \qquad (1)$$

Since the moment round the Y axis is balanced, the touch pressure Fx expressed by the following expression:

$$Fx = (fb + fc) \times L \qquad (2)$$

Since the moment round the X axis is balanced, the touch pressure Fy is expressed by the following expression:

$$Fy = (fc + fd) \times H \qquad (3)$$

Therefore, the coordinates x and y are obtained by the following expressions:

$$x = (fb + fc) \times L / (fa + fb + fc + fd) \qquad (4)$$

$$y = (fc + fd) \times H / (fa + fb + fc + fd) \qquad (5)$$

The CPU 57 can calculate the point (x, y) using the above expressions.

Next, an explanation will be made as for a judging process where the CPU 57 judges a presence or absence of switching input. The three parameter used for the judging process includes a touch pressure F obtained by the expression (1), a variation σF of touch pressure, and a variation (movement S) in a coordinate P (x, y) of a touch pressure obtained the expressions (4) and (5).

The steps where the CPU 57 detects a switching input using the parameters are explained below.

First, the difference between the graph showing the time vs touch pressure characteristics and the graph showing the time vs movement s characteristics will be explained in comparison with FIGS. 9(*a*) and 9(*b*) and 10(*a*) and 10(*b*). In one case, the operation surface 51a is touched intentionally with a finger to perform a switching input. In the other case, the operation surface 51a is touched intentionally to perform only a coordinate input operation, without performing a switch input operation.

When the operation surface 51a is touched intentionally to perform a switching input operation, the peak P1, as shown in FIG. 9(*a*), is usually detected in 30 ms from the time when the operation surface 51a has been touched and the peak P2 is detected in 60 ms from the time when the peak P1 has been detected. In most cases, the touch pressure F at the peak P2 exceeds 75 g. It was found that the variation (movement s) of the coordinate from the point corresponding to the peak P1 seldom exceeds 10 during the time between the peak P1 and the peak P2.

In many cases, when the operation surface 51a is touched only to input a coordinate without any intention of a switching input operation, it was found that the movement S from the peak P1 exceeds 10 during the time between the peak P1 and the peak P2. It is considered that this phenomenon is because a finger is moved as soon as the operation surface 51a is intentionally touched without performing a switching input.

In consideration of the differences obtained from the measured experimental results, when a switching input is intended or is not intended, the criterion for performing a judging process is as follows:

1) A peak P1 is detected within 30 ms after the operation surface 51a is touched.

2) A peak P2 is detected within 60 ms after the time of the peak point P1.

3) The touch pressure F of a peak P2 is more than 75 g.

4) The movement S from the peak point P1 exceeds 10 during the time between the peak point P1 and the peak point P2.

The judging steps (routine 1) according to the above criterion which is the first embodiment of the present invention will be explained with reference to FIG. 11. The CPU 57 samples coordinates touched and the touch pressures F at the coordinates every a fixed time and then processes according to the following steps:

In order to judge that a finger is in touch with the operation surface 51a, it is judged that whether the touch pressure F exceeds 15 g (step 101). When the touch pressure F is less than 15 g, the sequence returns to the step 101 ("No" decision in step 101). When the touch pressure F is more than 15 g ("yes" decision in step 101), the time measuring means in the CPU 57 sets the elapsed time T to zero (step 102). It is judged that the peak P1 is detected within the time T of less than 30 ms (step 103). In the step 103, the touch pressure F at the previous sampling time is stored in the RAM 59. The touch pressure F sampled currently is compared with the previously sampled touch pressure F. If the variation δF changes from a positive state to a negative state, it is recognized that the peak point P1 has been detected. In the step 103, when the peak P1 is not detected ("no" decision in step 103), it is judged whether the touch pressure F has exceeded 15 g (step 104). If the touch pressure F is less than 15 g, the sequence goes to the step 101 again ("no" decision in step 104). In the step 103, when the peak point P1 is detected ("yes" decision in step 103), the elapsed time T is set to zero (step 105) to judge whether the touch pressure F exceeds 15 g (step 106). When the touch pressure is less than 15 g, the sequence returns to the step 101 ("no" decision in step 106). If the the touch pressure is more than 15 g ("yes" decision in step 106), it is judged whether the movement S from the peak point P1 exceeds 10 during the period of time between the peak point P1 and the peak P2 (step 107). When the movement S exceeds 10, the sequence moves to the routine 3 ("yes" decision in step 107). When the movement S is less than 10 ("no" decision in step 107), it is judged whether the peak point P2 is detected within the time T of less than 60 ms (step 108). In the method of detecting the peak point P2 in the step 108, the time measuring means in the CPU 57 compares the touch pressure currently sampled with the touch pressures stored in the RAM 57 at previous three sampling times. Then when the variations δF increase continuously twice and then decrease continuously twice, it is recognized that the peak point P2 has been detected. Confirmation is continuously performed twice to increase the sampling accuracy. In the step 108, when the peak point P2 is detected, the flow returns to the step 106 ("no" decision in step 108). When the peak point P2 is detected ("yes" decision in step 108), it is judge whether the touch pressure F is more than 75 g (step 109). When the touch pressure F at the peak point P2 is less than 75 g ("no" decision in the step 109), the sequence moves to the routine 3. When the touch pressure F at the peak point P2 is more than 75 g ("yes" decision in step 109), the switch is turned on, thus shifting to the routine 2 described later (step 110). After a switching input is ONed, it is OFFed in accordance with the following conditions:

1) Touch pressure being less than 15 g.

According to the judging criterion, the routine 2 judges whether the touch pressure F exceeds 15 g (step 111). If the touch pressure F is more than 15 g ("yes" decision in step 111), the sequence returns to the step 111 again. In the step 111, the touch pressure F is less than 15 g ("no" decision in step 111), the switching input is OFFed to return the routine 1 (step 112).

In reference with FIGS. 12(a) and 12(b) and FIGS. 12(a) and 12(b), the difference between two cases will be explained using the graph showing the relationship between the time and touch pressure F and the graph showing the relationship between the time and movement S. In one case, a hard material such as a pen is touched to the operation surface 51a intentionally to perform a switching input. In the other case, a hard material such as a pen is touched to the operation surface 51a intentionally only to input coordinates without performing a switching input.

As shown in FIG. 12(a), when an operator touches the operation surface 51a with a hard material thing such as a pen intentionally to perform a switching input, a peak point P1 is detected within 30 ms from the time after touching while the touch pressure F exceeds 100 g. The touch pressure F falls to less than 15 g within less than 60 ms from the time after the peak point P1 has been detected. The movement S from the position corresponding to the peak point P1 does not exceed 10 during the period of time between the position corresponding to the peak point P1 and the position corresponding to the touch pressure F of less than 15 g.

On the contrary, in many cases, when an operator touches the operation surface 51a intentionally only to input coordinates without performing a switching input, the movement S from the peak point P1 exceeds 10 during the period of time between the time of the peak point P1 and the time corresponding to the touch pressure F of less than 15 g. It is considered that this phenomenon occurs since a hard material thing such as a pen is difficult to rebound during a dragging on the operation surface 1a and is moved on the operation surface 1a as soon as being touched to the operation surface 1a intentionally without performing the switching input, like the first embodiment.

In consideration with the difference between the measured experimental results, the processing operation at the time when a switching input is intended or is not intended is performed in accordance with the following judging criterion:

1) A peak point P1 is detected within 30 ms after the operation surface 51a has been touched.

2) A touch pressure F is less than 15 g within 60 ms from the time of the peak point P1.

3) A touch pressure F is less than 100 g at the peak point P1.

4) A movements S from the peak point P1 is less than 10 between the peak point P1 and the position of the touch pressure F of less than 15 g.

The judging process steps (routine 1') based on the criterion according to the present embodiment will be explained with reference to FIG. 14. In the second embodiment, the "no" branch of the step 106 in the first embodiment is followed by the route which shifts to the step 110 through the step 113.

When the touch pressure F in the step 106 does not exceed 15 g ("no" decision in step 106), it is judged whether the touch pressure F at the peak point P1 is over 100 g (step 113). When the touch pressure F at the peak point P1 does not exceed 100 g ("no" decision in step 113), the sequence returns to the step 101. When the touch pressure F at the peak point P1 exceeds 100 g ("yes" decision in the step 113), the switching is OFFed (step 110).

In reference with FIGS. 15(a) and 15(b) and FIGS. 16(a) and 16(b), the difference between two cases will be explained using the graph which shows the relationship between time and touch pressure F and the graph which shows the relationship between time and movement S. In one case, an operator touches strongly to the operation surface 51a to perform a switch inputting while a finger is moved on the operation surface 51a to input a coordinate. In the other case, an operator touches strongly to the operation surface 51a to draw, for example, a circle when a switch inputting is not intended.

As shown in FIG. 15(a), when an operator touches strongly the operation surface 51a intentionally to perform a switching input, the touch pressure F rises sharply to the peak point P4 within 150 ms from the time of the rising point P3. Then the pressure falls sharply and then settles to a gentle slope. In most cases, the touch pressure F at the peak point P4 is more than 150 g. The movement S from the rising point P3 between the peak point P3 and the peak point P4 is less than 10.

On the other hand, when the operation surface 51a is touched strongly without performing a switching input, the movement S from the rising point P3 between the peak point P3 and the peak point P4 exceeds 10 usually.

In consideration of the difference obtained the measured experimental results, the following judging criterion is determined when a switching input is intended or is not intended.

1) A peak point P4 is detected within 150 ms from the time of a rising time P4.

2) A touch pressure F at the peak point P4 is more than 150 g.

3) A movement S from the rising point P3 between the rising point P3 and the peak point P4 is less than 10.

The third embodiment (routine 3) being a processing step for judging according to the above criterion will be explained with reference to FIG. 17. When the step shifts to the routine 3 from the branch routine 1 or 2, it is judged first whether the increment δF of a touch pressure F is positive or negative (step 121). If the increment δF of the touch pressure F is less than zero ("no" decision in step 121), it is judged whether the touch pressure F is more than 15 g (step 122). If the touch pressure F is more than 15 g ("yes" decision step 122), the step returns to the routine 1. In the step 121, when the increment δF is positive ("yes" decision in step 121), it is judged whether the rising step P3 is detected. It is judged whether the increment δF has not sequentially exceeded 10 g three times by comparing data on the touch pressure F sampled currently with the two previous sampling times (step 123). If the the touch pressure does not sequentially exceed 10 g three times ("no" decision in step 123), the sequence returns to the step 122. If a touch pressure exceeds sequentially 10 g three times ("yes" decision in step 123), the touch pressure F at the rising point P3 being the point corresponding to the data of the first touch pressure in the continued touch pressures F is stored to the RAM 59 (step 124). It is judged whether the peak point P4 is detected (step 125). The peak point P4 is the point where the variation of a touch pressure F is sequentially positive three times and sequentially negative three times, within 100 ms from the time of the rising point P3. If the peak 4 is not detected ("no" decision in step 125), the sequence shifts to the step 122. When the peak 4 or the point where the variation δF of a touch pressure F changes from a positive state to a negative state ("yes" decision in step 125), the touch pressure F at the peak point P4 is stored in the RAM 59 (step 126). Then it is judged whether the touch pressure F at the peak point P4 is more than 150 g (step 127). If the pressure is less than 150 g ("no" decision in step 127), the step is shifted to the routine 1. If the pressure is more than 150 g ("yes" decision in step 127), it is judged whether the movement S is more than 10 between the rising point P3 and the peak point P4 (step 128). When the movement S is more than 10 ("no" decision in step 128), the step is shifted to the routine 1. When the movement S is less than 10, the switch inputting is OFFed so that the step is shifted to the routine 4 (step 129).

After being ONed, the switching input opration is OFFed according to the condition that a touch pressure F is smaller than that at the rising point P3 within 150 ms from the time of the peak point P4.

After the switch at the step 129 is ONed, it is judged whether the touch pressure F is smaller than that of the rising point P3 within 150 ms from the peak point P4 (step 130). If the pressure has a larger value ("no" decision in stop 130), the flow returns to the step 130 again. If the pressure is small ("yes" decision in the step 130), the switching input is OFFed to return to the routine 1 (step 131).

As described with the first to third embodiments, the present invention can judge accurately an operator's intention of a switching input because the variation (movement S) of a coordinate is considered in addition to a touch pressure F.

Furthermore, according to the present invention, when an operator carries out a moving operation during a switching input, it is possible to shift to a switch input continuing mode (dragging mode) even if he lifts his finger up from the operation surface 51a. The four embodiment (routines 1" and 2') as well as the fifth embodiment (routines 3' and 4') to shift to the dragging mode will be explained with reference to FIGS. 18 and 19.

In the fourth embodiment, as shown in FIG. 18, the step 141 which judges whether the movement S from the time of the peak point P1 exceeds 15 as well as the step 142 which enters the dragging mode follow the "yes" branch of the step 111 of the second embodiment. In other words, the step 143 for judging whether the current state is a dragging mode as well as the step 144 for turning off a switching input are added between the step 109 and the step 110.

Following the "yes" branch of the step 111, it is judged whether the movement S from the peak point P1 exceeds 15 (step 141). If the movement S is less than 15 ("no" decision in step 109), the routine returns to the step 111. If the movement S is more than 15 ("yes" decision in step 141), the sequence enters the dragging mode (step 142). When the touch pressure at the peak point P2 is more than 75 g ("yes" decision in step 109), it is judged whether the current state is in a dragging mode (step 143). If the state is not in a dragging mode ("no" decision in step 143), the switching input is ONed (step 110) or the dragging mode is released to return to the routine 1" (step 144).

In the fifth embodiment, as shown in FIG. 19, the step 151 which judges whether the movement S is less than 10 between the time of the peak point P4 and the time that the touch pressure F is becomes smaller than that at the peak point P3 as well as the step 152 for entering a dragging mode follow the "yes" branch of the step 130 of the third embodiment. In other words, the step 153 for judging whether the current state is in a dragging mode is inserted between the step 128 and the step 129.

In continuation of the "yes" branch of the step 130, it is judged whether the movement S is less than 10 between the time of the peak point P4 and the time when the touch pressure F is smaller than that at the rising point P3 (step 151). If the movement S is less than 10 ("yes" decision in step 151), the switch inputting is OFFed (step 131). If the movement S is more than 10 ("no" decision in step 151), the routine enters to a dragging mode (step 152). The "no" branch of the step 128 is followed by the step of judging whether the current state is a dragging mode (step 153). If the current state is a dragging mode ("no" decision in step 153), the switching input is ONed (step 129) to shift to the routine 4'. If the current state is a dragging mode ("yes" decision in step 153), the switching input is OFFed to return to the routine 1" (step 154).

An operator may strike against the end of an operation surface 1a while dragging his finger on it with a switching input ONed. In this case, according to the above process, the coordinate inputting operation can be continued with the switch inputting ONed even if he touches again to the operation surface 1a after have being left his finger off from it.

According to the first to fourth embodiments, the coordinate detecting portion for detecting coordinates on a rigid plate 1 where a touch pressure is applied as well as the switching input detection portion are constituted of the same pressure detecting member. However, the pressure detecting portion for detecting a switching input may be arranged on the back surface of the operation surface of a coordinate input detecting portion so as to be independent of the coordinate detecting portion.

For example, the coordinate input detecting portion may be a flat tablet of resistive film type, electrostatic coupling type, electromagnetic type, or optical type. At least one pressure detecting members may be arranged on the back of the tablet.

The processing circuit according to the present invention is a programmed logic circuit using a microcomputer. However, the logic circuit may be substituted by a wired logic circuit to perform the same processing.

Finally, an explanation will be made below as for a processing method for realizing a coordinate input device with good operability in drag processing when a post processing is made to the coordinate output after the coordinate detection process.

The coordinate input device according to the present invention does not transmit the coordinate P (x, y) at a touched point obtained by the expressions 4 and 5 to a personal computer without any processing but performs a post processing to it.

An arithmetic processing method where the cursor on a display screen of a personal computer moves the point P0 (X0, Y0) to Pn (Xn, Yn) when a finger is dragged from the point P0 (X0, Y0) to point Pn (Xn, Yn) on the operation surface 1a is achieved by the following steps:

It is assumed that while a finger moves from the point P0 (X0, Y0) to the point Pn (X0, Yn) on the operation surface 1a, a touch pressure at a coordinate or a touched point on the operation surface 1a is detected N times. At the k-th detecting time ($0 \leq k \leq N$), when the position on the operation surface 1a is Pk (Xk, Yk) and the touch pressure at the point is fk, the movement Vk per time or between the k-th detecting time and the (k+1)-th detecting time as well as the average touch pressure Gk per time are expressed by the following formulas:

$$V_k = \sqrt{(x_{k+1} - x_k)^2 + (y_{k+1} - y_k)^2}$$

$$G_k = (1/2)(f_{k+1} + f_K)$$

Function formulas including the above parameters Vk and Gk are defined as M=S(Vk) and N=T(Gk). The function formula including the parameters m and n is defined as U=H (m, n). Position Pn (Xn, Yn) is expressed by the following formula:

$$\begin{pmatrix} x_n \\ y_n \end{pmatrix} = \begin{pmatrix} x_0 \\ y_0 \end{pmatrix} + \sum_{k=0}^{n} u \begin{pmatrix} x_{k+1} - x_k \\ y_{k+1} - y_k \end{pmatrix}$$

The functions S(Vk), T(gK), and H(m, n) may be used as any functions including a function of higher order, an exponential function, a differential function, an inverse proportional function, and other functions.

According to the present embodiment, the function S(Vk) has a function of one order with a positive slope; the function function T(gk) is a function of one order with a negative function; and the function H(m, n) is H(m, n)=amn+bm+cn+d where a, b, c, and d (a>0) are a proportional constant, respectively.

In an achievement of the above arithmetic operation, when a control member is moved swiftly on the operation surface 1a with a light touch pressure, the movement of the cursor becomes large on a display. In addition when a control member is moved slowly on the operation surface 1a with a strong touch pressure, the movement of the cursor becomes small on a display. For that reason, an operability which provides an operator's operation feeling can be realized.

As described above, according to the present invention, a touch pressure of a control member is detected with a pressure sensitive sensor to calculate the movement, moving rate, and touch pressure of the control member; and the movement of a cursor is determined according to the first qualified value determined based on the movement and the moving rate and the second qualified value determined based on the touch pressure. An operator's natural motion can be reflected to the qualified value (conversion coefficient) for converting the movement of the control member into the movement of the cursor. Even if the operation surface is small, the touch pressure of the control member can be easily controlled and the second qualified value can be varied properly. As a result, an operability can be effectively improved largely in comparison with the conventional coordinate input device where the qualified value is determined only by the moving rate of a control member.

Moreover, the coordinate input device can provide good operability because the possibility that an operator performs unintentionally a switching input is prevented and a switching input is effective only when being performed intentionally in various operation conditions in accordance with actually measured data of touch pressure and operation movement at an operator's operation. The coordinate input device also can provide good operability in a narrow operation surface.

What is claimed is:

1. A coordinate input device for transmitting signals to a computer in response to contact by a soft control member such as a finger, the coordinate input device comprising:

an operation plate having an operation surface for receiving the contact applied by the soft control member;

pressure measuring means for measuring a pressure applied to the operation plate during the contact and a location of the contact of the soft control member on the operation plate, for generating a detection signal representing the measured amount of pressure, and for generating a plurality of location signals representing the measured contact location;

a first comparison means for measuring a first time period during which the measured pressure increases from a minimum value to a first peak value, and for comparing the measured first time period with a first prescribed value;

a second comparison means for measuring a second time period during which the measured pressure decreases from the first peak value and increases to a second peak value, and for comparing the second time period with a second prescribed value;

means for generating a switching signal when said first time period is less than said first prescribed value and said second time period is less than said second prescribed value, when a movement amount of the contact location between the first peak value and the second peak value is smaller than a predetermined distance, and when each of the first peak value and the second peak value is larger than a predetermined pressure value; and means for transmitting the switch signal to the computer.

2. A coordinate input device for transmitting a cursor movement signal to a computer, the cursor movement signal being used by the computer to position a cursor on a display device, the coordinate input device comprising:

a detection sensor for detecting a touch position in response to a touch with a control member and generating a detection sensor output signal;

computing means for computing from the detection sensor output signal a movement amount of the control member in response to successive touch positions detected by the detection sensor, for determining from the detection sensor output signal when the computed movement amount falls within a predetermined range and for generating the cursor movement signal based on the computed movement amount when the computed movement amount is equal to or greater than the predetermined range;

switch input discriminating means for discriminating between a signal for controlling cursor movement by said control member and a signal for conducting a switch input by said control member in accordance with the computing means determining that the computed movement amount of the control member falls within the predetermined range;

switching signal generating means for generating a switching signal in accordance with the result of the discrimination by said discriminating means;

a first switch input holding means for maintaining a switching operation state in a drag mode where a switching operation is maintained after said switching signal generating means has performed a switching operation;

a second switch input holding means for maintaining said switching operation state, after said switching operation state is operative and maintained by said first switch input holding means, even when the amount of movement of said control member has exceeded a predetermined value as when no touch is detected by said detection sensor because said control member has left said detection sensor; and a switch input releasing means for releasing said switching operation state held when said switch input discriminating means repeats a switching operation while one of said first and second switch input holding means hold said switching operation.

3. A coordinate input device for transmitting signals to a computer in response to contact by a hard control member such as a pen, the coordinate input device comprising:

an operation plate having an operation surface for receiving the contact applied by the hard control member;

a contact detecting means for measuring pressure applied to the operation plate during the contact and a contact location of the hard control member on the operation plate, for generating a detection signal representing the detected amount of pressure, and for generating a plurality of location signals representing the measured contact location;

a first comparison means for measuring a first time period for the detected amount of pressure to increase from a minimum value to a first peak value, and for comparing the measured first time period with a first prescribed value;

a second comparison means for measuring when the first peak value is 100 g or greater, and for comparing the measured movement amount with a predetermined movement amount;

means for generating a switching signal when said first comparison means indicates that said first time period is less than the prescribed value and said second comparison means indicates that said measured movement amount is less than the predetermined movement amount; and means for transmitting the switch signal to the computer.

4. A coordinate input device, comprising:

a detecting mechanism to detect a contact of an operating member with an operation surface and to detect a position to which said operating member has been moved on said operation surface, the detection mechanism generating a detection output that varies continuously with a continuous variation of the contact of the operating member with the operation surface; and a processing mechanism to recognize, based on the detection output from said detecting mechanism, an amount of movement of said operating member on a coordinate system, and to discriminate, based on the amount of movement of said operating member contacting said operation surface, between a switch input operation and an operation for moving said operating member operational to input coordinates;

wherein:

said processing mechanism determines that a switch input operation has occurred when the amount of movement of said operating member contacting said operation surface exceeds a predetermined value;

said processing mechanism changes a drag mode in response to determining that said switch input operation has occurred, said drag mode being either on or off; and said drag mode maintains a switch input state when said drag mode is on.

5. A coordinate input device according to claim 4, wherein said drag mode remains on when said operating member is removed from the operation surface.

6. A coordinate input device, comprising:

detecting mechanism to detect a contact of an operating member with an operation surface and to detect a position to which said operating member has been moved on said operation surface, the detection mechanism generating a detection output that varies continuously with a continuous variation of the contact of the operating member with the operation surface; and processing mechanism to recognize, based on the detection output from said detecting means, an amount of movement of said operating member on a coordinate system, and to discriminate, based on the amount of movement of said operating member contacting said operation surface, between a switch input operation and an operation for moving said operating member operational to input coordinates;

wherein:

said processing mechanism determines that a switch input operation has occurred when the amount of movement of said operating member contacting said operation surface exceeds a predetermined value within a predetermined period;

said processing mechanism changes a drag mode in response to determining that said switch input operation has occurred, said drag mode being either on or off; and said drag mode maintains a switch input state when said drag mode is on.

7. A coordinate input device according to claim 6, wherein said drag mode remains on when said operating member is removed from the operation surface.

\* \* \* \* \*

UNITED STATES PATENT AND TRADEMARK OFFICE
CERTIFICATE OF CORRECTION

PATENT NO.    : 6,124,845
DATED         : September 26, 2000
INVENTOR(S)   : Yasushi Toda et al.

Page 1 of 1

It is certified that error appears in the above-identified patent and that said Letters Patent is hereby corrected as shown below:

Title page,
Column 1, after item [73], insert new item as follows:

-- Notice: This patent issued on a continued
Prosecution application filed under 37 CFR 1.53 (d),
And is subject to the twenty year patent term
provisions of 35 U.S.C. 154 (a) (2). --.

Column 1, Item [63],
Change "5,673,066." to -- 5,673,066, which is a continuation of Ser. No. 08/047,221 filed April 14, 1993. --.

Column 2,
Line 6, under "ABSTRACT", change "detector" to -- means --.
Line 12, under "ABSTRACT", change "detector" to -- means --.

Claim 2,
Line 45, change "hold" to -- holds --.

Signed and Sealed this

Eighteenth Day of December, 2001

*Attest:*

JAMES E. ROGAN
*Attesting Officer*  *Director of the United States Patent and Trademark Office*